(12) United States Patent
Bonafe et al.

(10) Patent No.: US 12,204,980 B2
(45) Date of Patent: Jan. 21, 2025

(54) INTELLIGENT LOGISTICS VEHICLE FOR DETECTING ASSET LOCATION

(71) Applicant: UNITED PARCEL SERVICE OF AMERICA, INC., Atlanta, GA (US)

(72) Inventors: Jethro Bonafe, Atlanta, GA (US); Christopher Azar, Atlanta, GA (US); Dennis Bautista, Atlanta, GA (US); Vincent Pizzuto, Atlanta, GA (US); Derek Uber, Atlanta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

(21) Appl. No.: 18/089,925

(22) Filed: Dec. 28, 2022

(65) Prior Publication Data
US 2024/0220745 A1     Jul. 4, 2024

(51) Int. Cl.
| | |
|---|---|
| *G06K 7/10* | (2006.01) |
| *G06K 19/07* | (2006.01) |
| *G06K 19/077* | (2006.01) |
| *G06Q 10/0833* | (2023.01) |
| *H04B 17/318* | (2015.01) |

(52) U.S. Cl.
CPC ..... *G06K 7/10099* (2013.01); *G06K 19/0723* (2013.01); *G06K 19/07705* (2013.01); *G06Q 10/0833* (2013.01); *H04B 17/318* (2015.01)

(58) Field of Classification Search
None
See application file for complete search history.

(56) References Cited

U.S. PATENT DOCUMENTS

| | | | | |
|---|---|---|---|---|
| 5,013,253 | A * | 5/1991 | Aiello | F21V 23/02 439/235 |
| 7,465,179 | B1 * | 12/2008 | Tseng | H01R 4/4821 439/235 |
| 9,030,321 | B2 * | 5/2015 | Breed | G01S 13/04 455/39 |
| 10,410,176 | B2 | 9/2019 | Borders et al. | |
| 11,983,596 | B2 * | 5/2024 | Yeh | G06K 19/0717 |
| 2008/0266092 | A1 | 10/2008 | Campero et al. | |
| 2011/0195701 | A1 * | 8/2011 | Cook | G01S 5/0018 455/422.1 |

(Continued)

FOREIGN PATENT DOCUMENTS

| | | | | |
|---|---|---|---|---|
| AU | 2016203027 A1 * | 12/2016 | | B61K 9/08 |
| CA | 2651722 A1 * | 11/2007 | | B65F 1/1484 |

(Continued)

*Primary Examiner* — Fekadeselassie Girma
(74) *Attorney, Agent, or Firm* — Shook, Hardy & Bacon L.L.P.

(57) ABSTRACT

In some embodiments, a first indication that a first antenna, of multiple antennas, has received data from a first tag coupled to an asset is received. The antennas are coupled to an interior housing within a logistics vehicle. A second indication that a second antenna, of the antennas, has received the data from the first tag is also received. Based at least in part on the receiving of the first indication and the receiving of the second indication, a location within the logistics vehicle that asset is located in is detected. In response to the detecting of the location, a control signal is transmitted that causes a user device or apparatus to indicate that the asset is located within an area associated with the location.

19 Claims, 12 Drawing Sheets

(56) References Cited

U.S. PATENT DOCUMENTS

| | | | |
|---|---|---|---|
| 2014/0209676 A1* | 7/2014 | Reynolds | B60R 99/00 |
| | | | 235/385 |
| 2016/0284185 A1* | 9/2016 | Maison | H04B 5/70 |
| 2018/0247259 A1 | 8/2018 | Borders et al. | |
| 2019/0124475 A1 | 4/2019 | Swart | |
| 2020/0042850 A1* | 2/2020 | Singh | H04B 1/38 |
| 2020/0089233 A1* | 3/2020 | Kurk | G05D 1/0022 |
| 2021/0216953 A1* | 7/2021 | Ramos | G06K 19/0723 |
| 2022/0207473 A1* | 6/2022 | Freeman | G06K 7/10356 |
| 2024/0094005 A1* | 3/2024 | Kovacs | G06Q 10/0833 |
| 2024/0161591 A1* | 5/2024 | Haynes | G06Q 10/0833 |

FOREIGN PATENT DOCUMENTS

| | | | | | |
|---|---|---|---|---|---|
| CA | 3158677 A1 | * | 5/2021 | | B01L 3/5453 |
| CA | 3030040 C | * | 12/2021 | | G01S 19/48 |
| CN | 112711265 B | * | 1/2022 | | G05D 1/0808 |
| WO | WO-2017004701 A1 | * | 1/2017 | | H04W 4/029 |

* cited by examiner

| ANTENNA | LOGISTICS VEHICLE AREA ID | HIGH PROBABILITY MS READ |
|---|---|---|
| 1 | 1 | TRUE |
| 2 | 1 | FALSE |
| 3 | 1 | FALSE |
| 4 | 2 | TRUE |

FIG. 6.

INTELLIGENT LOGISTICS VEHICLE FOR DETECTING ASSET LOCATION

BACKGROUND

The proliferation of wireless technologies, mobile computing devices, apps, and the Internet has fostered a growing interest in location-aware technologies. These technologies can locate objects using techniques such as Global Position System (GPS) triangulation or the like. Typical location-sensing technologies include static components or are limited in functionality. This can cause, among other things, inaccurate location prediction of assets (e.g., parcels, containers, or other items) inside a logistics vehicle. As described in more detail herein, aspects improve these technologies and conventional solutions.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter. Further, alternative or additional embodiments exist other than those described in this summary section.

Some embodiments are directed to a system comprising the following components—a logistics vehicle and multiple Radio Frequency Identification (RFID) antennas coupled to an interior housing within the logistics vehicle. The RFID antennas are at least partially configured to receive data from one or more RFID tags coupled to one or more assets. The RFID antennas are associated with one or more RFID reader devices. The system further comprises at least one computer processor and one or more computer storage media storing computer-useable instructions that, when used by the at least one computer processor, cause the at least one computer processor to perform the following operations—receiving an indication that a first RFID antenna, of the RFID antennas, has received data from a first RFID tag coupled to an asset. Based at least in part on the receiving of the indication, detecting a location within the logistics vehicle that asset is located in. And in response to the detecting of the location, transmitting a control signal that causes a user device or apparatus to indicate that the asset is located within an area associated with the location.

Some embodiments are directed to a computer-implemented method comprising the following operations—receiving a first indication that a first antenna, of multiple antennas, has received data from a first tag coupled to an asset. The antennas being coupled to an interior housing within a logistics vehicle. A second indication that a second antenna, of the antennas, has received the data from the first tag is also received. Based at least in part on the receiving of the first indication and the receiving of the second indication, a location within the logistics vehicle that asset is located in is detected. In response to the detecting of the location, a control signal is transmitted that causes a user device or apparatus to indicate that the asset is located within an area associated with the location.

Some embodiments are directed to a computer system comprising at least one computer processor; and one or more computer storage media storing computer-useable instructions that, when used by the at least one computer processor, cause the at least one computer processor to perform the following operations. A first indication that a first antenna has received data from a first tag coupled to an asset is received. The first antenna is coupled to an interior housing within a logistics vehicle. A second indication that the first antenna has received data from a second tag coupled to the interior housing within the logistics vehicle is also received. Based at least in part on the receiving of the first indication and the receiving of the second indication, a location within the logistics vehicle that asset is located in is detected. In response to the detecting of a location, a control signal is transmitted that causes a user device or apparatus to indicate that the asset is located within an area associated with the location.

BRIEF DESCRIPTION OF THE DRAWINGS

Figure 1:
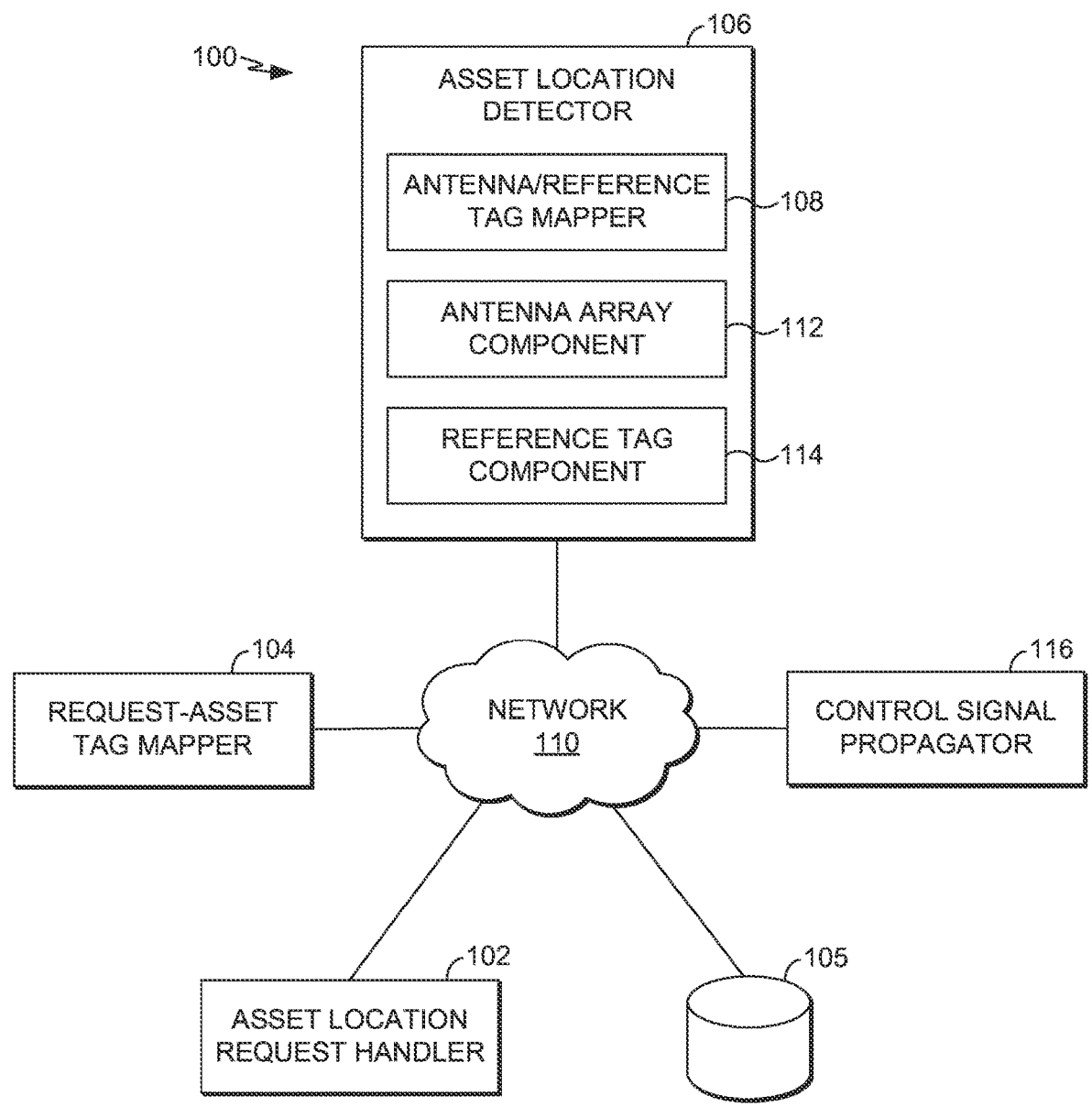
Figure 2:
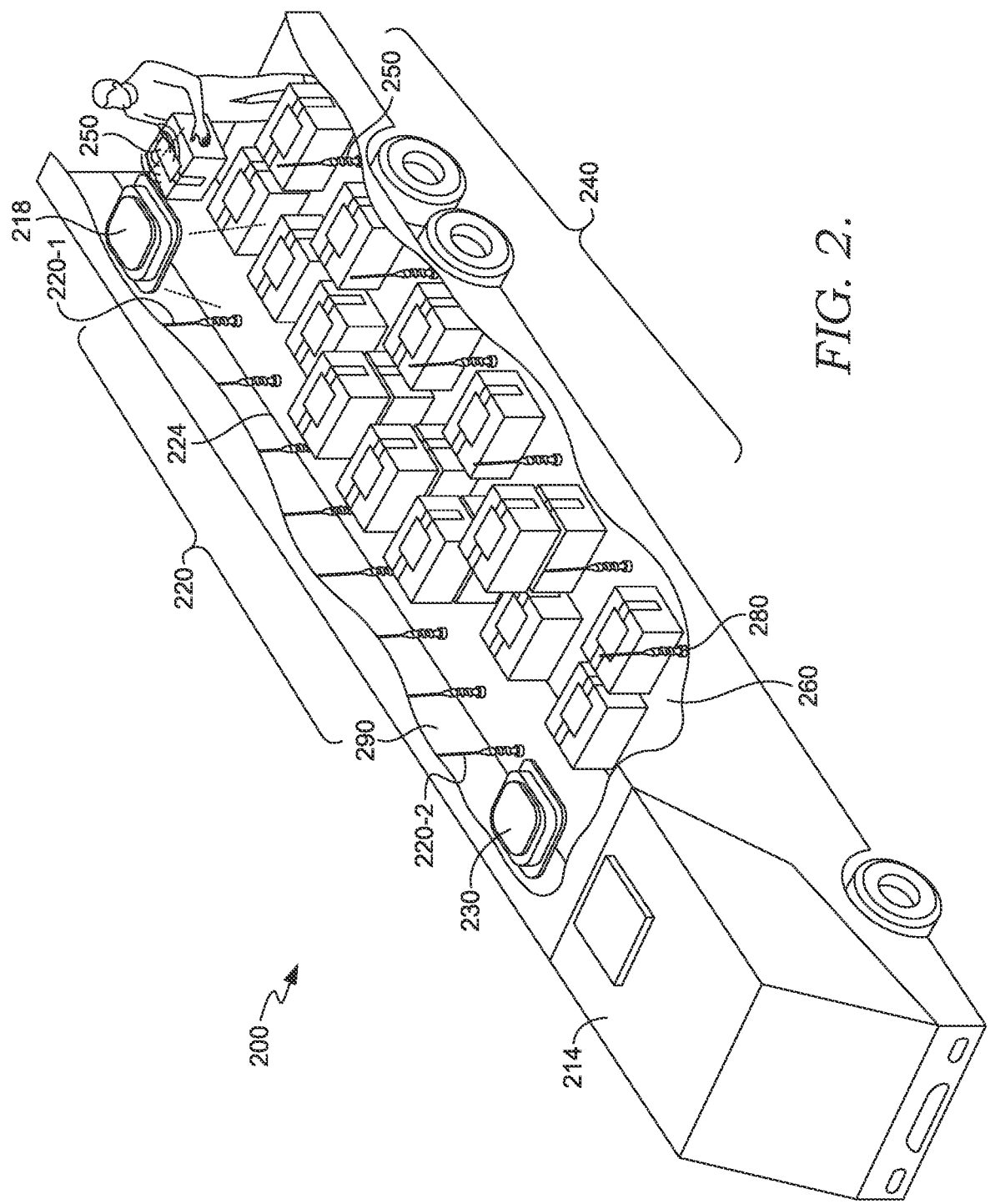
Figure 3:
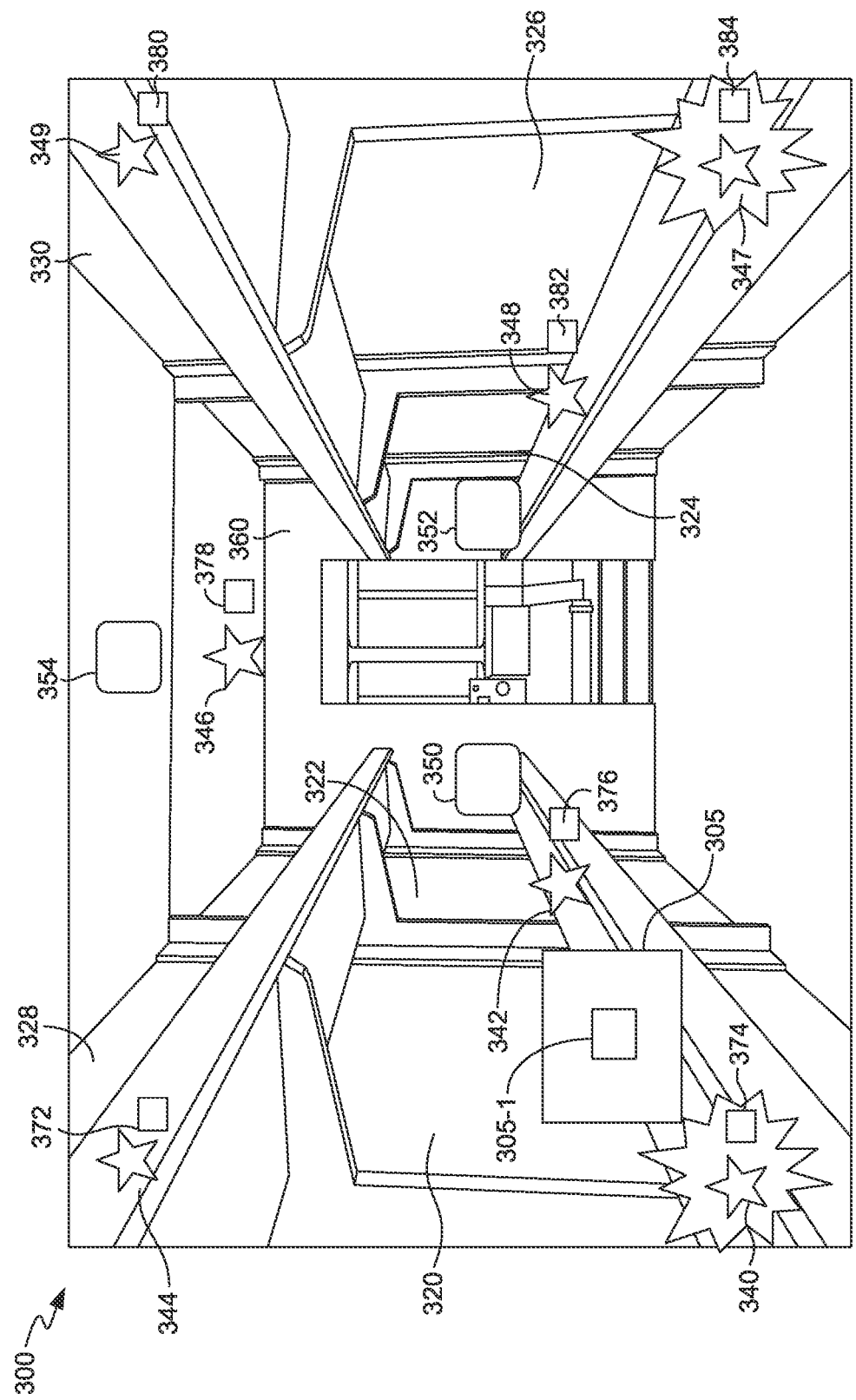
Figure 4A:
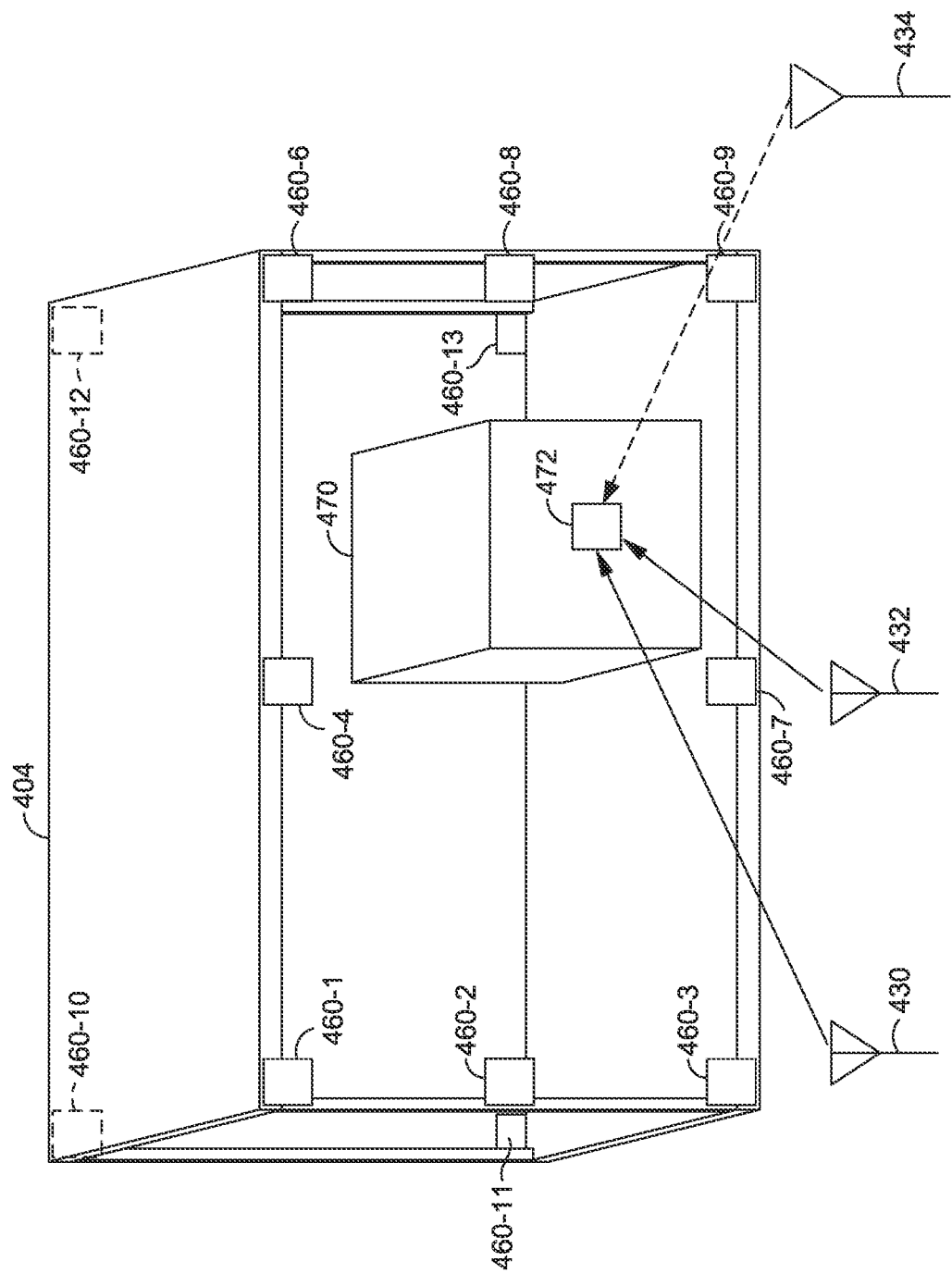
Figure 4B:
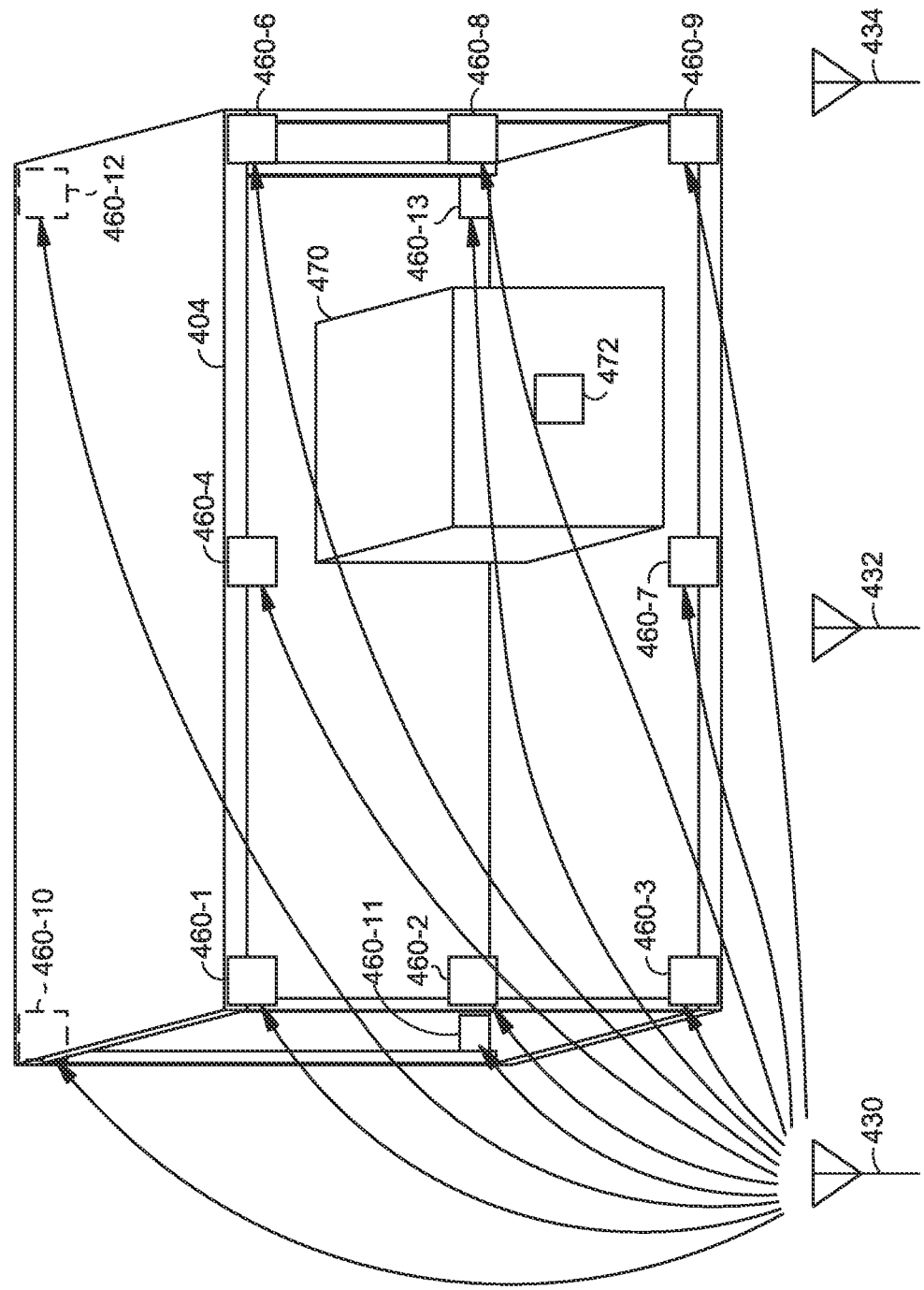
Figure 4C:
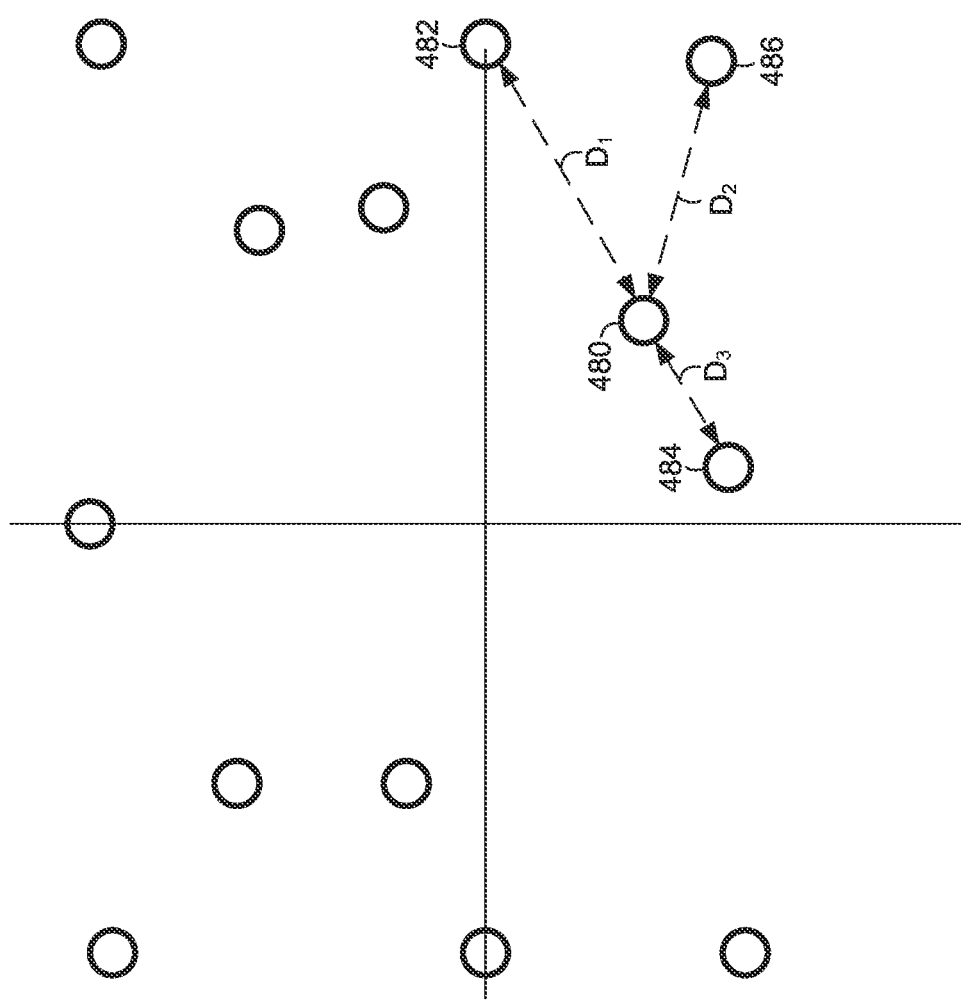
Figure 5:
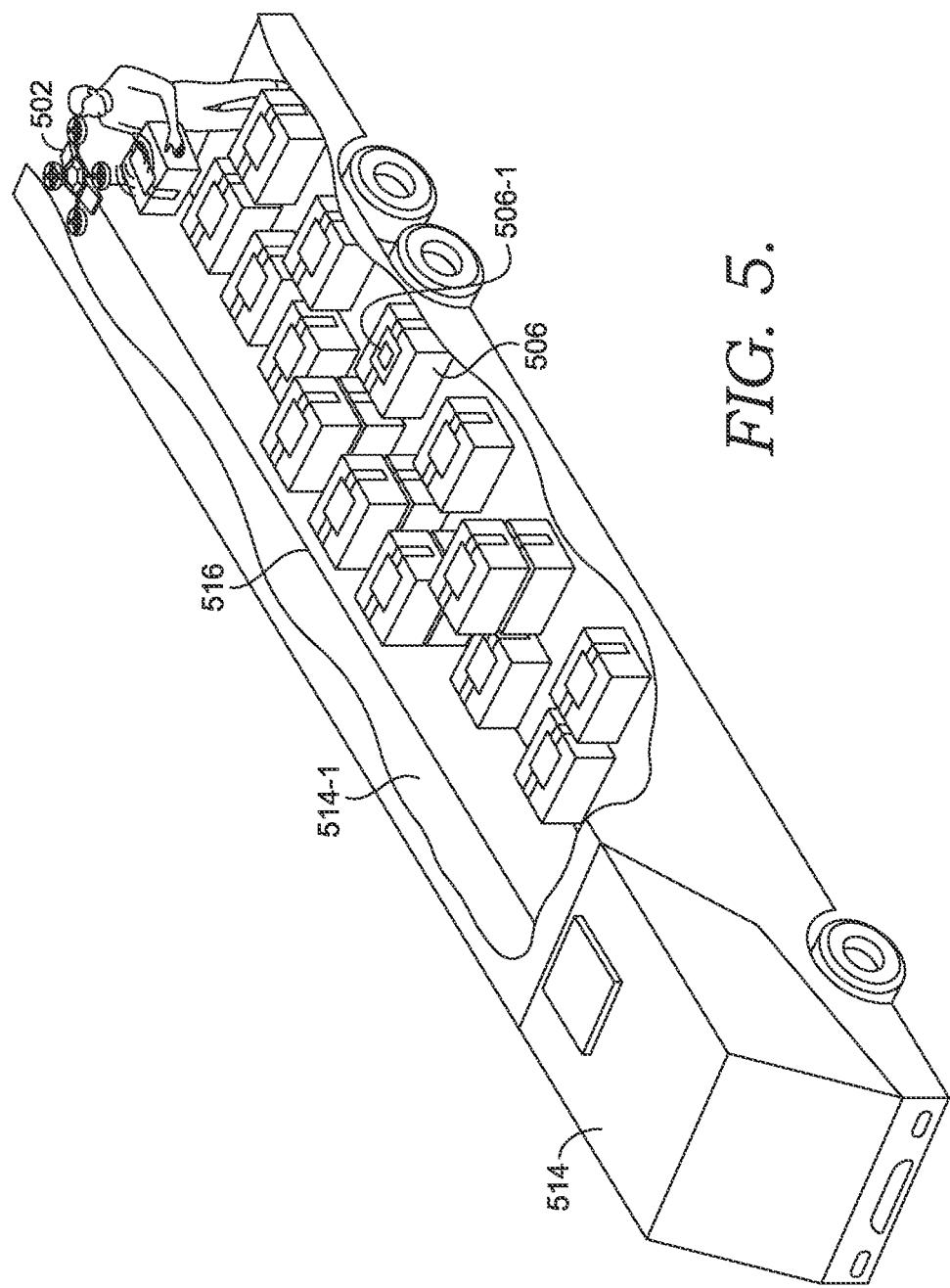
Figure 7:
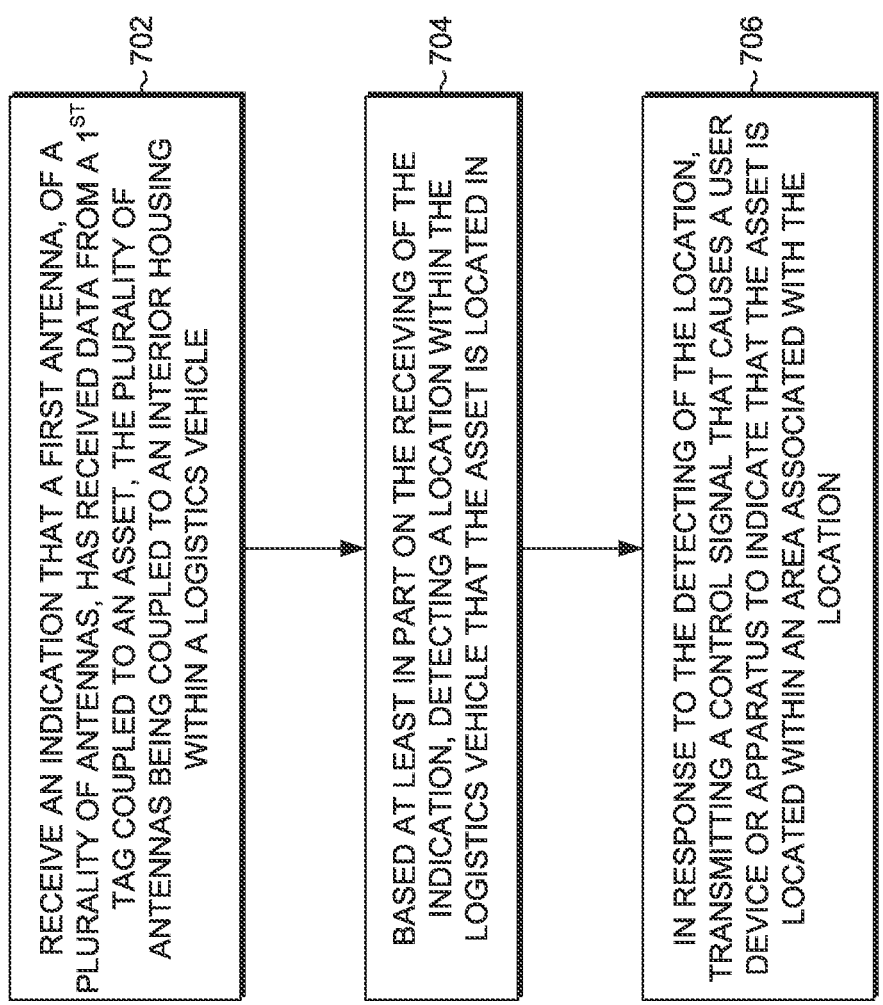
Figure 8:
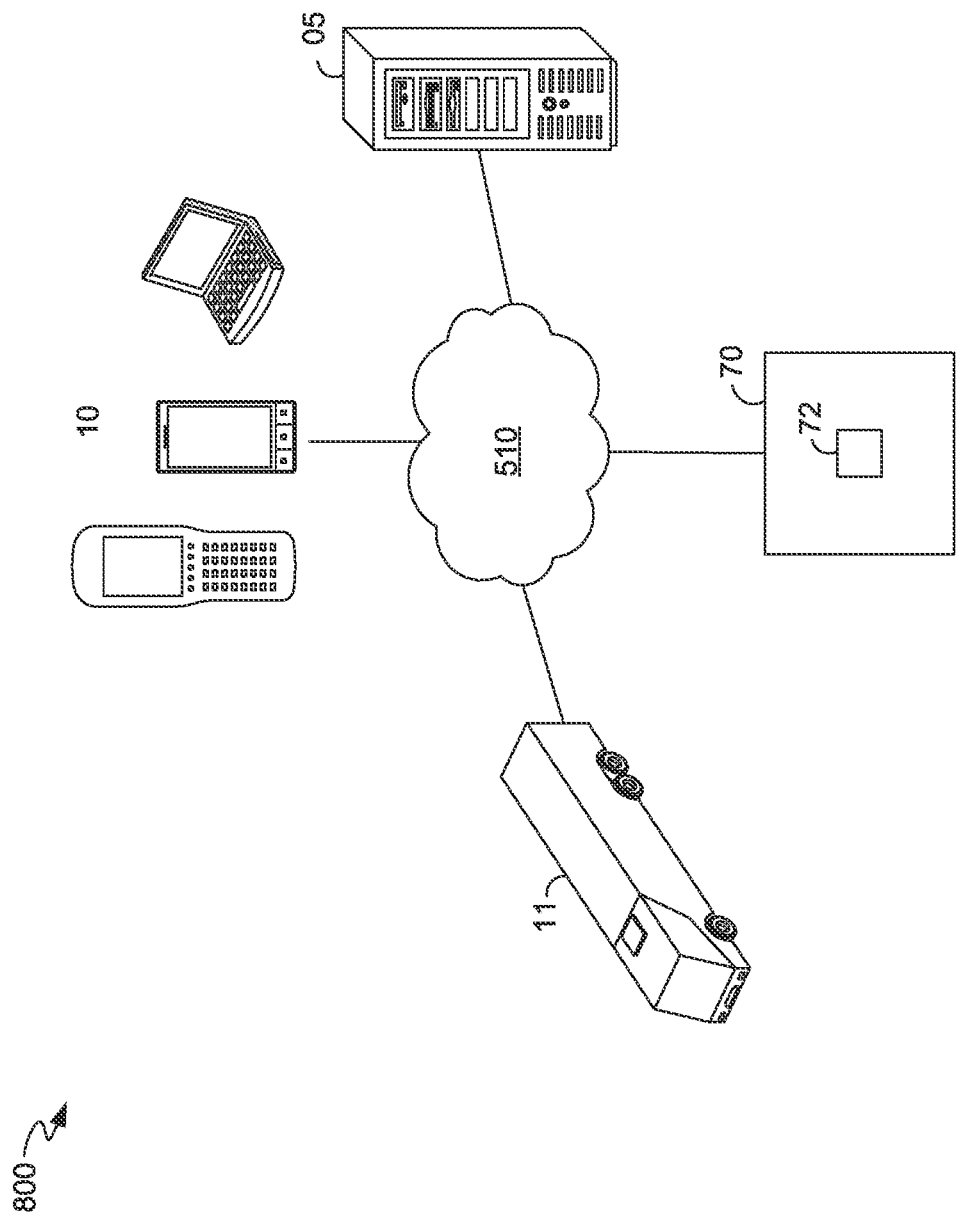
Figure 9:
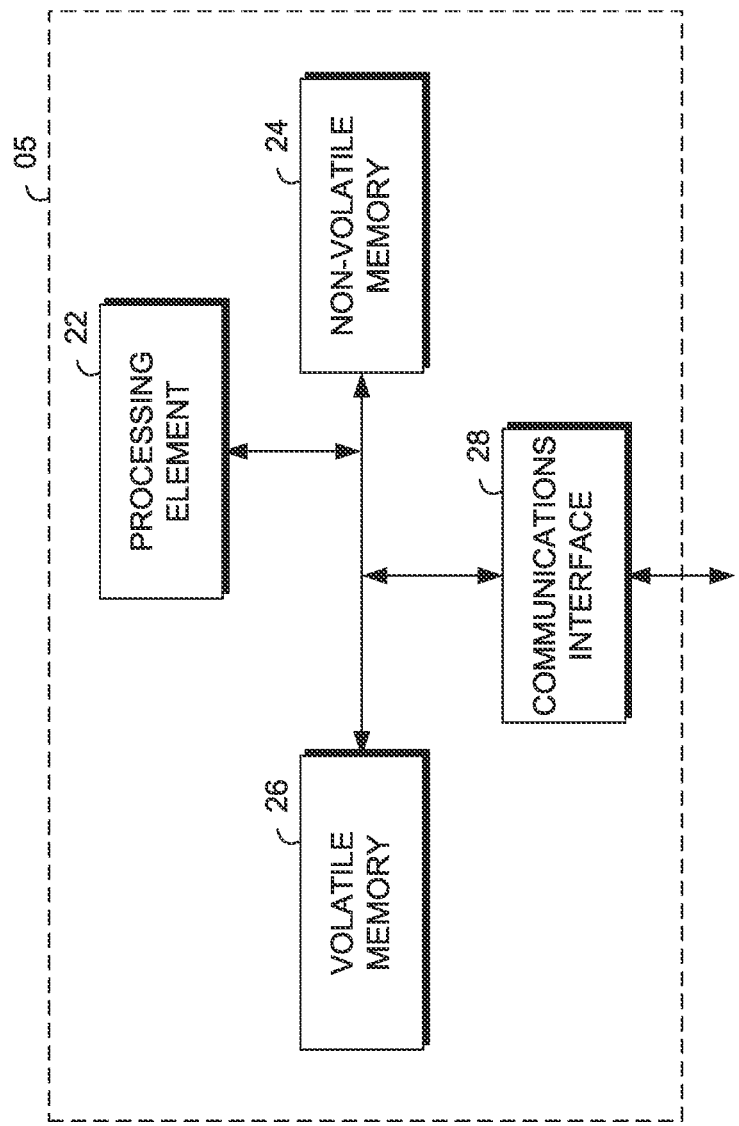
Figure 10:
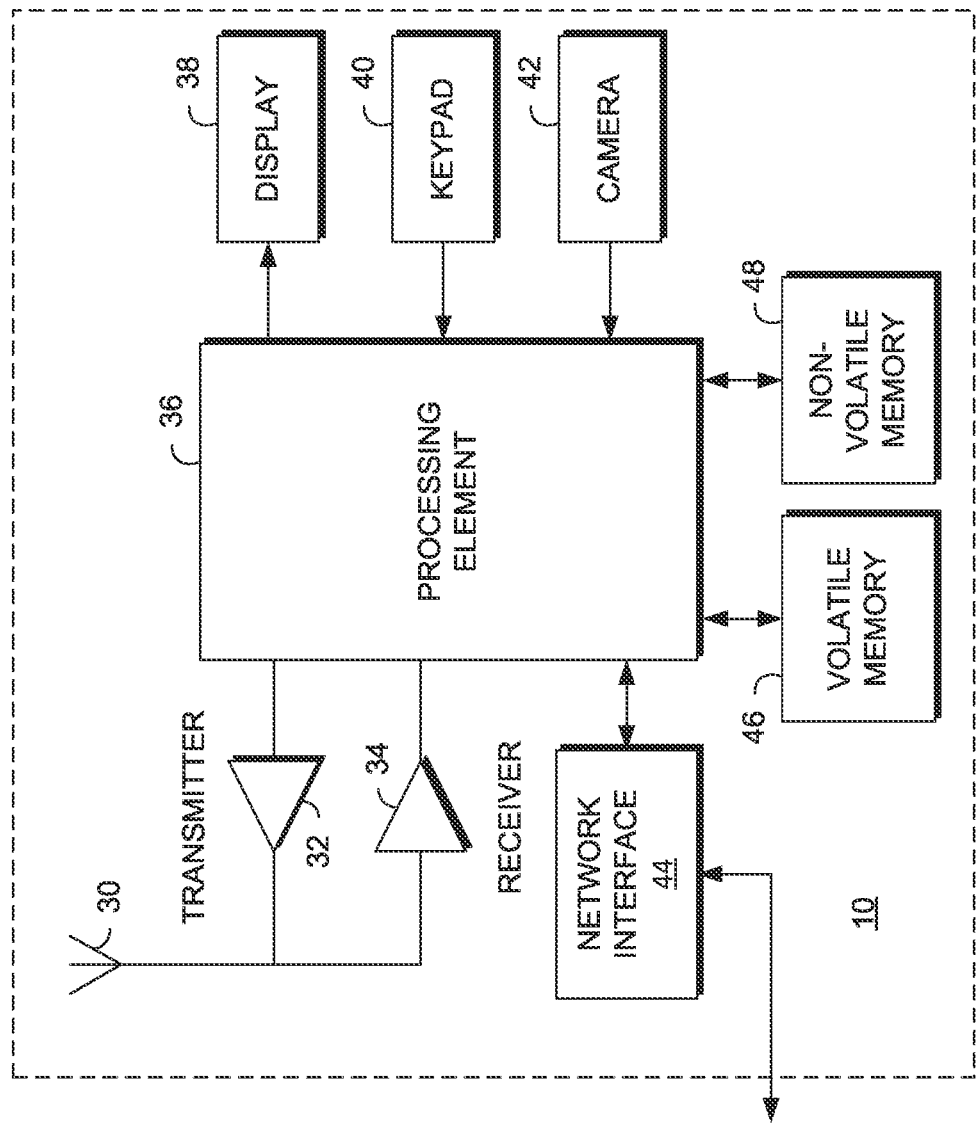

Having thus described the disclosure in general terms, reference will now be made to the accompanying drawings, which are not necessarily drawn to scale, and wherein:

FIG. 1 is a block diagram illustrating an example computing system architecture suitable for implementing embodiments of the disclosure;

FIG. 2 is a schematic diagram of an example logistics vehicle, according to some embodiments;

FIG. 3 is a schematic diagram of an interior housing of a logistics vehicle illustrating how various reference tags and light devices are used to guide a driver to the correct location of a particular asset, according to some embodiments;

FIG. 4A is a schematic diagram of a storage unit that illustrates which particular storage unit an asset is predicted to be located in and/or where an asset's exact location within the storage unit is, according to some embodiments;

FIG. 4B is a schematic diagram of the storage unit of FIG. 4A, which illustrates how to predict or detect an asset's (or tag coupled to the asset's) exact location within a storage unit, according to some embodiments;

FIG. 4C illustrates data points in dimensional or vector space that represent the signal strength indications of FIGS. 4A and 4B, according to some embodiments;

FIG. 5 is a schematic diagram of an example logistics vehicle illustrating a moving device that is used to detect a location of an asset, according to some embodiments;

FIG. 6 is a diagram of a data structure that maps each antenna to a particular area within a logistics vehicle and whether such antenna has a high probability of a misread, according to some embodiments;

FIG. 7 is a flow diagram of an example process for detecting the specific location of an asset within a logistics vehicle, according to some embodiments;

FIG. 8 is a schematic diagram of an example computing environment in which aspects of the present disclosure are employed in, according to some embodiments;

FIG. 9 is a block diagram of the analysis computing entity of FIG. 8, according to some embodiments; and FIG. 10 is a block diagram of the source computing entity of FIG. 8, according to some embodiments.

DETAILED DESCRIPTION OF THE INVENTION

The present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. Like numbers refer to like elements throughout.

I. Overview

In the shipping industry, before an asset (e.g., a package, a container, or bag of small items) reaches a final delivery destination, it typically goes through various operations. For instance, after a package has been dropped off at a carrier store for a delivery request, it may be routed to a sorting facility, such as a hub. The package may traverse various different conveyor belt assemblies and go through different sorting processes in the hub based on information associated with the package (e.g., size of package, destination address, weight, etc.). After traversal of the package through the hub, a user may load the package into a logistics vehicle (e.g., a package car). When a delivery for the package occurs at the final delivery destination, a delivery driver may have to open the bulkhead door of the logistics vehicle and walk down the bed of the logistics vehicle to locate the package and then drop off the package at the final delivery destination.

Existing technologies for locating assets within a logistics vehicle have limited functionality or features, are inaccurate, negatively impact the user experience, and unnecessarily consume computing resources, among other technical problems. For example, location-sensing technologies, such as Global Positioning System (GPS) technologies, are incapable of, or have difficulty with, detecting assets inside a logistics vehicle, and if they do detect assets, the location detection accuracy is limited, among other technical problems.

As described above, existing location sensing technologies are limited in functionality or component makeup. For example, certain infrared indoor location technologies, such as Active Badge, employ diffuse infrared technology to realize indoor location positioning. However, the line-of-sight requirement and short-range signal transmission are two limitations that suggest it to be less than effective in practice for indoor location sensing. Other examples include Cricket Location Support System ultrasonic technologies. The Cricket Location Support System and similar systems (e.g., Active Badge location system) use an ultrasound time-of-flight measurement technique to provide location information. This technique, however, requires a great deal of infrastructure in order to be effective and accurate, yet the cost is so exorbitant that it is inaccessible to most users.

Further, certain GPS-based technologies are inaccurate with respect to precise location sensing. These GPS-based technologies, such as GPS-enabled smart phones, are typically accurate within a 4.9 meter (i.e., 16 foot) radius under an open sky. However, 16 feet is not precise enough of an area to be useful for a user to find a package within a logistics vehicle. In fact, some logistics vehicles are around 16 foot in length and so this technology is not granular enough in its location sensing of assets. Moreover, GPS-based technologies worsen near buildings (or inside buildings or other structures), bridges, trees, or other structures. Other location-sensing technologies assume that all tags have roughly the same signal strength in emitting an RF signal, which can lead to inaccurate results.

Various embodiments of the present disclosure provide one or more technical solutions to one or more of these technical problems described above. In operation various embodiments of the present disclosure are directed to a logistics vehicle that includes multiple antennas (e.g., Radio Frequency Identification (RFID) antennas) coupled to an interior housing within the logistics vehicle. These antennas are at least partially configured to receive data from one or more tags (e.g., RFID tags) coupled to one or more assets.

Various embodiments are further directed to receiving an indication that a first antenna, of the multiple antennas, has received data from a first tag coupled to an asset. Based at least in part on the receiving of the indication, some embodiments detect a location within the logistics vehicle that asset is located in. For example, based on comparing indications of signal strength values between each RFID antenna, of multiple RFID antennas, and an RFID tag, the location is detected based on which RFID antenna is receiving data at a highest signal strength value relative to other RFID antennas. This corresponds to a quick and dirty trilateration based on antenna locations and signal strengths.

In response to the detecting of a location, some embodiments transmit a control signal that causes a user device or apparatus to indicate that the asset is located within an area associated with the location. For example, some embodiments transmit a control signal to a source associated with first light device (e.g., a Light Emitting Diode (LED)), of multiple light devices, where each light device is coupled to a respective storage unit, of multiple storage units within the logistics vehicle. Such transmission of the control signal causes the first light device to emit light, where the emission of the light indicates that the asset is located within the first storage unit. In this way, for example, carrier personnel may receive a visual indication of where a package is located so that the personnel may know where to walk to within the logistics vehicle to find the package for the next stop on a delivery route.

Various embodiments of the present disclosure improve these location sensing technologies because they include new functionality and components that improve the accuracy of location sensing systems, among other things. For example, some embodiments improve existing GPS, Active Badge, and Cricket Location Support System technologies because more accurate location sensing is achieved. This is at least partially because some embodiments employ multiple antennas and/or reference tags in fixed locations in different areas within a logistics vehicle unlike these technologies. In other words, one technical solution is the use of multiple antennas and/or reference tags within a logistics vehicle, as described in more detail below.

The use of multiple antennas and/or reference tags within a logistics vehicle allows for more granular or precise location sensing. This is because multiple antennas, a tag coupled to an asset, and/or multiple reference tags are situated near each other within a logistics vehicle. Accordingly, for example, each antenna of a reader device and/or reference tag is associated with a different sub-section within the logistics vehicle. Thus when a particular antenna is receiving data from a tag coupled to an asset and/or a reference tag, the position of such tag(s) or antenna is triangulated at a granular level within the logistics vehicle based on the positioning of the antenna, the reference tags (e.g., as mapped in a data structure) and/or other signal characteristics, such as signal strength, quantity of reads, and the like and as discussed in more detail below. Thus, unlike having a 16 foot radius variability for location sensing as some GPS-based technologies do, particular embodiments can detect a location of an asset within a foot or less inside the logistics vehicle. Moreover, unlike GPS-based technologies, particular embodiments do not worsen near buildings (or inside buildings or other structures), bridges, trees, or other structures. This is because the multiple antennas and/or tags are located within a logistics vehicle and are not subject to these same interferences. Further, particular embodiments do not assume that all tags have roughly the same signal strength in emitting an RF signal, which can lead to inaccurate results. Accordingly, one technical solution is thus the use of signal strength (e.g., RSSI) characteristics to detect location.

Employing multiple antennas and/or reference tags in fixed locations inside logistics vehicles also allows for redundancy checks, which also improves existing technologies. The benefit of redundancy in these embodiments is that there may be multiple tags and/or antennas in near positions such that any interference or noise experienced at one tag and/or antenna location does not typically affect sensor readings of all of the other tags/antennas. Ideally, wireless communication between devices occurs via a line-of-sight path (i.e., waves travel in a direct path) between transmitter and receiver that represents clear spatial channel characteristics. However, in practice communications may not occur via a line-of-site path because of physical barriers or other interference obstacles (e.g., multiple packages stacked on top of each other) between transmitter and receiver. This can cause reflection, attenuation (or fading), phase shift, and/or distortion (e.g., due to noise) of the signals among other things, thereby reducing performance, such as signal strength. However, employing multiple tags/antennas at different locations increases the likelihood that not all reader/antenna pairs will be subject to the same interference or noise at the same time, thereby allowing more accurate sensor readings for location sensing.

The use of RFID technologies within logistics vehicles also improves existing location sensing technologies. As described above, Active Badge and other technologies have a line-of-sight requirement and short-range signal transmission. However, RFID does not have as strict of line-of-sight requirements and has a relatively longer range signal transmission. Accordingly, one technical solution is that the antennas and/or tags is RFID-based.

Various embodiments of the present disclosure not only improve location sensing technologies but they improve conventional asset location solutions used in the shipping industry. For example, typical solutions for finding assets in the shipping industry require extensive manual human intervention, such as arduously and manually searching for a package within a logistics vehicle until the asset is found. Various embodiments of the present disclosure require little to no human intervention because multiple antennas and/or tags inside a logistics vehicle may be utilized as described above. Although some conventional shipping solutions use tracking technologies, such as Global Positioning Systems (GPS) to track packages, they have an inherent problem of accurately determining locations of objects inside structures, such as logistics vehicles. Further, existing GPS technologies and other solutions in the shipping industry do not perform the more granular and redundant location sensing functionality, as described above. Moreover, conventional logistics vehicles themselves are not able to be used at all for asset location because they are not equipped with antennas, reference tags, and/or moving devices. However, various embodiments of particular logistics vehicles as described herein are equipped with these components, thereby facilitating the detection of location of particular assets within a logistics vehicle, as described in more detail herein.

In is understood that although this overview section describes various improvements to conventional solutions and technologies, these are by way of example only. As such, other improvements are described below or will become evident through description of various embodiments. This overview is provided to introduce a selection of concepts in a simplified form that are further described below in the detailed description. This overview is not intended to: identify key features or essential features of the claimed subject matter, key improvements, nor is it intended to be used in isolation as an aid in determining the scope of the claimed subject matter.

II. Example Computing Architecture

Referring now to FIG. 1, a block diagram illustrating an example computing system architecture (referred to as the "system 100") suitable for implementing embodiments of the disclosure. The system 100 is generally responsible for detecting or predicting the location of a particular asset (or tag coupled to the asset) within a logistics vehicle based on antenna and/or tag readings. In some embodiments, a "tag" as described herein is any physical object that stores, at minimum, an identifier (ID) that identifies the tag or other unique identifier (i.e., a "tag ID"). The identifier (and potentially other data) is configured to be received by one or more antennas of one or more reader devices and then read by the reader device. For example, in some embodiments, a RFID tag includes an antenna or radio (for transmitting its tag ID to an RFID antenna) and a RFID chip (e.g., an integrated circuit), which store's the tag's ID and other information. In another example, a tag is or includes a paper label with a matrix or barcode with an encoded ID.

In some embodiments, a "reader device" as described herein is any suitable reader machine, manufacture, or module that is configured to read data (e.g., a tag ID) stored to a tag. For example, a reader device can be Radio Frequency Identification (RFID) reader, a Near-field Communication (NFC) reader, an optical scanner, an optical reader, a bar code scanner, a magnetic ink character recognition reader, a beacon reader, or the like.

In some embodiments, any reader device or tag combination described herein is part of a Radio Frequency Identification (RFID) system. Accordingly, these components may include the components and functionality of RFID tags and readers, for example. RFID is a way to store and retrieve data through electromagnetic transmission to an RF compatible integrated circuit. An RFID reader device can read data emitted from or located within RFID tags. RFID readers and tags used a defined radio frequency and protocol to transmit or provide (via tags) and receive (via antennas of reader devices) data. RFID tags are categorized as at least passive or active. Passive RFID tags operate without a battery. They reflect the RF signal transmitted to them from an antenna of a reader device and add information by modulating the reflected signal. Their read ranges are limited relative to active tags. Active tags contain both a radio transceiver and a battery to power the transceiver. Since there is an onboard radio on the tag, active tags have more range than passive tags. It is noted however, that the reader devices or tags need not be a part of RFID protocols, but can alternatively or additionally include other protocols, such as BLUETOOTH LOW ENERGY (BLE), Bar codes, QR codes, and the like.

The system 100 includes an asset location request handler 102, a request-asset tag mapper 104, an asset location detector 106, a control signal propagator, and storage 105, each of which is communicatively coupled via one or more networks 110. The network(s) 110 is any suitable network(s), such as a Local Area Network (LAN), a Wide Area Network (WAN), the internet, or a combination of these, and/or include wired, wireless, or fiber optic connections. In general, network(s) 110 represent any combination of connections (e.g., APIs or linkers) or protocols that will support communications between the components of the system 100. In some embodiments, the components of the system 100 are embodied as a set of compiled computer instructions or functions, program modules, computer software services, logic gates, or an arrangement of processes carried out on one or more computer systems.

The asset location request handler 102 is generally responsible for receiving a request to locate a particular asset within a logistics vehicle and programmatically calling other functions or components to trigger the execution of the request. For example, a user, such as a driver of a logistics vehicle may input, at a Delivery Information Acquisition Device (DIAD) or other mobile device, a next location that the driver will stop at along the driver's delivery route. In response to such input, the DIAD transmits, over the network 110, a request to a server (e.g., the analysis computing entity 05 of FIG. 9) to locate all packages that will need to picked within logistics vehicle to deliver at the next location. Accordingly, the server receives this request, which is a request to locate one or more assets within the logistics vehicle. In some embodiments, the asset location request handler 102 then programmatically calls the request-asset tag mapper 104, the asset location detector 105, and/or the control signal propagator 114, as described in more detail below.

The request-asset tag mapper 104 takes, as input, the request received from the asset location request handler 102, and then maps (e.g., via a hash map) the request to one or more tag IDs of tags coupled to one or more assets that need to be picked within the logistics vehicle for a particular stop. In an illustrative example, if a first delivery stop for a logistics vehicle is to be at a first address, the request-asset tag mapper 104 reads a data structure that indicates that 4 packages with their corresponding IDs are to be delivered to the first address. This component may then look up, in a look-up table, each package ID as a key, and associate each package to the tag attached thereto by looking up the corresponding tag ID in the same record or entry of the look-up table. In some embodiments, the request-asset tag mapper 104 then programmatically calls the asset location detector 106 and passes along the tag ID of the assets needing to be found so that the asset location detector 106 can perform its functionality, as described in more detail below.

The asset location detector 106 is generally responsible for receiving, as input, the tag IDs from the request-asset tag mapper 104 and then detecting a location of corresponding asset(s) within the logistics vehicle. In some embodiments the asset location detector 106 detects asset location by generating a score that estimates the probability or likelihood (e.g., a confidence level interval) that an asset is located in a particular location. For example, the detection of asset location can include a continuum of probabilities that an asset is in different locations, which is directly proportional to the detected signal strength between antenna and asset tag—the higher the signal strength between antenna and tag, the higher the probability that the asset is in a corresponding location and the lower the signal strength between antenna and tag, the lower the probability that the asset is in a corresponding location.

The asset location detector 106 includes an antenna/reference tag mapper 108, an antenna array component 112, and the reference tag component 114. The antenna/reference tag mapper 108 is generally responsible for mapping the tag IDs received from the request-asset tag mapper 104 to the corresponding tag IDs received from the antenna(s) within the logistics vehicles. In this way, the antenna/reference tag mapper 108 can look up corresponding readings or signal strength values associated therewith. For example, if the mapper 108 receives tag ID 1, it can use tag ID 1 as a key to look-up near real time tag reading values (e.g., signal strength) that particular antennas are receiving data from the corresponding tag. In some embodiments, the antenna/reference tag mapper 108 is alternatively or additionally responsible for mapping antenna IDs of antennas within a logistics vehicles to reference tag IDs of reference tags located within the logistics vehicle.

In some embodiments, one or more "reference tags" are coupled to a logistics vehicle and are generally responsible for indicating or emitting/transmitting data (e.g., to a respective antenna), such as an identifier that identifies the respective reference tag, which can be used to predict the location of a tag coupled to an asset, as described in more detail below. For example, indications that a similar signal strength profile between a first antenna device and a tag coupled to an asset and the first antenna device and a reference tag indicates that both tags are near each other and because the reference tag is mapped to a particular location within a logistics vehicle, the tag attached to the asset must be within or near the particular location.

The antenna array component 112 is generally responsible for detecting the location of an asset (or tag coupled to the asset) based on using multiple antennas within a logistics vehicle. In an illustrative example, each antenna, of multiple antennas that are spread out inside of a logistics vehicle, receives a tag ID from a tag (attached to a package) at a particular signal strength level (or the antenna emits an interrogation signal to an asset tag at the particular signal strength level). The higher the signal strength level, the closer the tag is to the antenna. Each antenna is mapped, via a data structure, to a specific location within the logistics vehicle indicating its location. Accordingly, a quick and dirty trilateration of the tag can occur via signal strength comparisons. In other embodiments, read counts and moving devices (e.g., drones) can be used to detect location via the antenna array component 112, as described in more detail below.

The reference tag component 114 is generally responsible for detection of the location of an asset (or tag coupled to the asset) based on using multiple reference tags within a logistics vehicle. In an illustrative example, each reference tag, of multiple tags are spread out inside of a logistics vehicle. Each reference tag emits a tag ID at a particular signal strength level to one or more antennas (or the one or more antennas emit an interrogation signal to each reference tags at the particular signal strength level). The tag located on a package also emits its own tag ID at a particular strength level. Each reference tag-antenna pair thus has its own signal strength level characteristics, which is then compared to a signal strength level characteristic between the tag located on the package and one or more antennas. The closer the match in signal strength level characteristics, the more likely that the tag attached to the asset is near the tag located in a predefined area within the logistics vehicle. That is each reference tag is mapped, via a data structure, to a specific location within the logistics vehicle indicating its location. Accordingly, a quick and dirty trilateration of the tags can occur via signal strength comparisons.

It is understood that in some embodiments, only the antenna array component 112 is used by the asset location detector 106. In other embodiments, only the reference tag component 114 is used by the asset location detector 106. In yet other embodiments, a combination of both the antenna array component 112 and the reference tag component 114 are used by the asset location detector 106 to detect a location of an asset inside a logistics vehicle.

The control signal propagator 116 takes as input, the location detected via the asset location detector 106, and is generally responsible for causing a control signal to be transmitted to a source (e.g., an antenna or computing device), which causes an apparatus (e.g., a Light Emitting Diode (LED)) or a user device (e.g., a DIAD) to indicate that the asset is located within an area associated with the location. For example, the control signal propagator 116 transmits a control signal to an antenna within a logistics vehicle, which causes a specific LED on a specific shelf to emit light, which indicates that the detected asset is within the particular shelf.

The storage 105 (e.g., a database, RAM, cache, persistent storage, RAID, etc.) includes different data structures as described herein, such as the mappings used by the request-asset tag mapper 104 or the antenna/reference tag mapper 108. Additionally or alternatively, storage 105 includes any procedures, routines, or other logics described herein associated with the asset location request handler 102, the request-asset tag mapper 104, the asset location detector 106, and/or the control signal propagator.

III. Example Logistics Vehicles

FIG. 2 is a schematic diagram of an example logistics vehicle 214, according to some embodiments. In some embodiments, FIG. 2 represents the environment for which the antenna array component 112 of FIG. 1 works. As illustrated in FIG. 2, the interior housing 260 of the logistics vehicle 214 includes multiple assets, such as the asset 250-1, the RFID reader devices 218 and 230 coupled to (or build within) the sidewall 270 (or ceiling) of the logistics vehicle 214, and a first array of antennas 220 coupled to the sidewall 270 and a second array of antennas 240 coupled to the floor 280 (or a second sidewall). Each of the antennas are coupled to each other and the RFID reader devices 218 and 230 via the common bus or communications link 224. The communications link 224 is a wired connection coupled to (or build within) the sidewall 270 of the logistics vehicle 214 and connects to each of the RFID antennas (220 and 240) so as to relay readings to or from the RFID reader devices 218 and 230.

In some embodiments, an RFID antenna (e.g., the RFID antenna 220-1) is a transceiver that is configured to both interrogate, by transmitting a signal to, one or more tags located on one or more assets (e.g., the tag 250-1 of the asset 250) and responsively receive, from a corresponding tag coupled to a respective asset, a corresponding tag ID. In some embodiments, however, the RFID antenna is only a receiver, which is configured to passively receive (and not transmit) RFID tag ID(s) from respective tag(s). In some embodiments, in response to receiving a tag ID from one or more tags coupled to one or more assets, the antenna(s), such as the antenna 220-1, is configured to transmit, to the reader device(s) 218 and/or 230, not only the tag ID of the tag it has received from one or more tags, but its own antenna ID and/or other metadata, such as signal strength values, and/or the like. In this way, it can be determined which antennas, via their ID, were reading which tags at what signal strength or if they received a tag ID at all. In some embodiments, an intermediary device, such as a processor or computing device, is the actual device that transmits the antenna ID to the reader device(s) 230 and/or 218 (instead of the antenna).

For example, upstream from each of the antennas within the arrays 220 and 240, there may be a respective computing device that is configured to capture the tag ID received from the corresponding antenna. A gate may route the tag ID signal to a computing device, which then transmits its own ID (representing the antenna ID) to the reader device(s).

The RFID reader devices 218 and 230 are configured to receive, via the communications link 224 and from each of the antennas (within the arrays 220 and 240) a respective RFID tag ID, antenna ID, and/or other metadata, and then read or decode such ID. For example, in response to the antenna 220-1 being within a distance threshold or communication range to the tag 250-1, the tag 250-1 transmits, via a separate antenna, its ID to the RFID antenna 220-1. The RFID antenna 220-1 responsively transmits the tag ID through the communications link 224 to the RFID reader device 218, which then reads or decodes the tag ID. In some embodiments, these same steps are repeated for one or more other antennas within the antenna array 220 and/or 240.

As illustrated in FIG. 2, there are multiple antennas within the arrays 220 and 240 that are evenly spaced out within the logistics vehicle 214 such that the RFID reader devices 218 and/or 230 are able to capture signals from a tag coupled to an asset located in any position within the logistics vehicle 214. In other words, in some embodiments, any one given antenna has a transmitting and/or receiving range capacity relative to its specific position. For example, the antenna 220-1 may only be able to transmit an interrogation signal to areas that include the half of the logistics vehicle 214 that the antenna 220-1 is located in. Accordingly, the antenna 220-1 may not be able to transmit a signal to a tag coupled to a package near the reader device 230, which is on the other side of the logistics vehicle 214. Therefore, particular embodiments additionally use antenna 220-2 (or other nearby antennas) so as to provide a greater transmission and/or receiving range for a wider lens of visualization within the logistics vehicle 214 and more granular location detection.

In some embodiments, in response to the RFID reader device 218 and/or 230 decoding or reading each tag ID derived from a corresponding antenna, such as 220-2, the RFID reader device(s) transmits (e.g., via the antenna 220-2), over a network, the tag ID, the antenna ID(s) of the antenna(s) responsible for receiving the tag, and/or other metadata (e.g., signal strength value), to a central server or other device (e.g., a cloud computing node), which then associates the tag ID to the corresponding package and the logistics vehicle that the RFID reader device(s) are located in. For example, a server may perform a lookup, at a data structure, of tag ID to a corresponding package and a received antenna ID along with its signal strength value. Based on these mappings, the server infers that the package 250, for example, is located within a particular area near the antenna 220-1 of the logistics vehicle 218 because, for example, the signal strength between the antenna 220-1 and the tag 250-1 is greater than the signal strength value between the antenna 220-2 and the tag 250-1 (or any other antenna signal strength). It is understood, however, that in some embodiments, such backend server functionality is alternatively performed at the RFID reader device 230 and/or 218 itself or other computing device local to or within the logistics vehicle 214.

In some embodiments, one or more of the antennas of the first array of antennas 220 or the second array of antennas 240 represent antennas of reference tags or reference tags themselves. In this way reference tags can be used as a way to triangulate the position of a tag coupled to an asset. In these embodiments, for example, an antenna is coupled to the reader device 218 and/or 230. Such antennas are configured to transmit data (interrogate a tag) and/or receive data from any reference tag and/or tag coupled to an asset that will listen or is within a signal strength or communication range threshold of the antenna. In this way, a location of an asset or tag can be detected based on surrounding reference tag readings. For example, in response to an antenna within the reader device 218 transmitting an interrogation signal, the tag 250-1 transmits its tag ID back to the reader device at a first signal strength level. Additionally, the reference tag 220-1 transmits its respective tag ID back to the reader device ID 218 at a second signal strength level. Additionally, a second reference tag located further away from the tag 250-1 (relative to the tag 220-1) may transmit its respective tag ID to the reader device 218 at a third signal strength level. In some embodiments, based on the second signal strength being higher than the third signal strength, particular embodiments determine that the asset 250 (or the tag 250-1) is closest to the tag 220-1 (or in an area associated with the tag 220-1). Additionally or alternatively, based on the first and second signal strength being within a threshold (e.g., within 3 RSSI values) of each other or otherwise sharing similar signal strength characteristics relative to the first and third signal strength, some embodiments determine that the asset 250 is closest to the tag 220. Particular embodiments then perform a lookup function to map, the tag ID of the tag 220-1, to its corresponding location in the logistics vehicle 214 and then transmit, for example, a notification to a user device of a driver of the logistics vehicle 214 indicating where, within the logistics vehicle 214, the asset 250 is located.

In some embodiments, the RFID reader devices 218 and/or 230 alternatively or additionally represents a wand. A wand is an optical reader that is configured to read barcodes or other machine-readable indicia (e.g., QR codes or matrix code) and/or natural language (e.g., via Optical Character Recognition (OCR)). Wands typically capture package information on a package label, such as addresses, names, tracking numbers.

In some embodiments, for example, the reader device 218 is configured to automatically propagate a signal and responsively receive and read data from each label of each asset that is within a communication range. In this way, more information associated with a package can be captured based on which labels are within a communication reading range of the reader device 218 in order to map the asset information to a tag or asset. For example, wand may receive package level information, such as destination address, originating address, and shipping entity. After decoding such information, the wand transmits, over a network, its ID, a tag ID, as well as the package level information. Responsively, a server maps the wand ID to an ID of the vehicle it is located in—314. The server additionally maps the package level information to a particular asset ID and then maps the asset ID to the logistics vehicle ID that the asset is assigned to be transported in, as well as a tag ID. In this way, the asset tag's location can be triangulated and mapped to other important information.

FIG. 3 is a schematic diagram of an interior housing 300 of a logistics vehicle illustrating how various reference tags and light devices are used to guide a driver to the correct location of a particular asset, according to some embodiments. The interior housing 300 includes the antennas 350, 352, and 354, the lighting devices 340, 342, 344, 346, 348, and 349, the reference tags 370, 372, 374, 376, 378, 380, 382, and 384, the storage units 320, 322, 324, 326, 328, and 330, the asset 305 (which includes the tag 305-1), and the bulkhead door 360. In some embodiments, the logistics vehicle 214 of FIG. 2 additionally includes each of the lighting devices 340, 342, 344, 346, 348, and 349, and the reference tags 370, 372, 374, 376, 378, 380, 382, and 384 to perform functionality as described herein. In some embodiments, one or more of the antennas 350, 354, and 352 represent particular antennas within the antenna array 220 or 240 of FIG. 2.

The use of reference tags are described in more detail below. However, one illustrative example of how the tag 305-1 is triangulated in order to provide an indication to a driver on which shelf it is located in is as follows. Each of the antennas 350, 354, and 352 (coupled to a reader device) is configured to transmit data (interrogate one or more tags) and/or receive data from any reference tag and/or tag 305-1 coupled to the asset 305 that will listen or is within a signal strength or communication range threshold of the respective antenna. In this way, a location of the asset 305 or tag 305-1 can be detected based on surrounding reference tag readings. For example, in response to the antenna 350 transmitting an interrogation signal, the tag 305-1 transmits its tag ID back to the antenna 350 at a first signal strength level. Additionally, the reference tag 374 transmits its respective tag ID back to the same antenna 350 at a second signal strength level. Additionally, a second reference tag, 382, located further away from the tag 250-1 (relative to the reference tag 374) may transmit its respective tag ID to the same antenna 350 at a third signal strength level. In some embodiments, based on the second signal strength being higher than the third signal strength, particular embodiments determine that the asset 305 (or the tag 305-1) is closest to the tag 374 or within the storage unit 342. In some embodiments, such determination is based on mapping, via a data structure, each reference tag ID of a corresponding reference tag to a storage unit ID of a corresponding storage unit. In other words, particular reference tags are associated with a predefined or predetermined storage unit or other location.

Additionally or alternatively, based on the first and second signal strength being within a threshold (e.g., within 3 RSSI values) of each other or otherwise sharing similar signal strength characteristics relative to the first and third signal strength, some embodiments determine that the asset 305 is within the storage unit 320 (and not any other storage units). Particular embodiments perform a lookup function to map, the tag ID of the tag 374, to its corresponding location in the interior housing 300 and then transmit, for example, a control signal to a source, which causes the light device 340 to emit light, as illustrated in FIG. 3 (where the other light devices do not emit light). In this way, the driver can then, for example, open the bulkhead door 360 and see that only the light device 340 is emitting light and no other light devices are emitting light. In this way the driver can more quickly locate the asset 305, since the driver will go straight to the storage unit 320, as opposed to manually searching for the asset because the light device 340 is the only light device that is emitting light.

FIG. 4A is a schematic diagram of a storage unit that illustrates which particular storage unit an asset is predicted to be located in and/or where an asset's exact location within the storage unit is, according to some embodiments. In some embodiments, storage unit 404 represents any suitable storage unit (e.g., 320) of FIG. 3 and the antennas 430, 432, and 434 represent suitable antennas (e.g., 350, 352, and 354) of FIG. 3. Some embodiments use a mapping and/or similar data structures to predict that the asset 470 is located within storage unit 404 (and not in other storage units) based on the proportion of antennas mapped to the storage unit 404 that are actually scanning or have scanned (e.g., for a particular time window) the asset 470. This is to say that some embodiments determine which antennas (or reader devices) has received data from the tag 472 and then mapping those reader antennas to the storage unit 404. In an illustrative example, the following algorithm can be performed for the asset 470 needing to be located. During a time window X or in near-real-time, certain embodiments extract all scanning data for the asset 470 and place them into SCANS (i.e., antennas 430 and 432 are the only antennas that have received or are currently receiving data from tag 472. Then, particular embodiments calculate the unique list of antenna values (e.g., antenna or reader device IDs) present in SCANS. Mappings may then be used to determine which storage IDs are assigned to the unique antennas (i.e., all antennas 430, 432, and 434 are mapped to storage unit 404). For storage unit 404, embodiments calculate SIGNAL_PROPORTION as the percentage of antennas mapped to the storage unit 404, which are present in SCANS. For example, reader devices 430, 432, and 434 are mapped to storage unit 404, and asset 470 has scanning data for only antenna 430 and 432, then target asset 470 has a SIGNAL_PROPORTION of 0.66. Put another way, 2 of the 3 antennas (430 and 432) that are mapped to storage unit 404 are actually present in the scanning data (have received or are currently receiving the tag ID) whereas one of the antennas (i.e., 434) mapped to the storage unit 404 is not present in the scanning data and so 2 divided by 3 is 0.66, representing the proportion or percentage of antennas mapped to a given storage unit that are actually scanning or have scanned the tag 472. Accordingly, embodiments determine whether all antennas defined in the configuration file or mapping that are mapped to the storage unit 404 are actually receiving or have received data from the tag 472. If all of the antennas 430, 432, and 434 that are mapped to storage unit 440 would have read the target tag 472, this represents the highest proportion or score. Conversely, if none of the antennas 430, 432, or 434 that are mapped to the storage unit 404 would have read the tag 472, this represents the lowest proportion or score.

In an illustrative example, the following algorithm or first pseudocode sequence can be performed for each target asset needing to be located. During a time window X or in near-real-time, certain embodiments extract all scanning data for each target asset and place them into SCANS. Then, particular embodiments calculate the unique list of reader device values (e.g., reader device IDs) present in SCANS. Responsively, some embodiments use the configuration file to identify all unique reader devices that are currently reading or have read the asset(s). Mappings may then be used to determine which storage IDs are mapped to the unique reader devices. Continuing with the first pseudocode sequence, for each storage unit, embodiments calculate SIGNAL_PROPORTION as the percentage or proportion of reader devices mapped to that storage unit which are present in SCANS. For example, if reader devices A, B, and C are mapped to shelf 1 (e.g., as indicated in the mapping 600), and package X has scanning data for Antenna A, C, and Q, then package X has a SIGNAL_PROPORTION of 0.66. Put another way, 2 of the 3 reader devices that are mapped to shelf 1 are actually present in the scanning data (have read or are currently reading the target tag) and so 2 divided by 3 is 0.66, representing the proportion or percentage of reader devices mapped to a given shelf that are actually scanning or have scanned a particular target tag. Accordingly, embodiments determine whether all reader devices defined in the configuration file or mapping that are mapped to a given storage unit are actually reading or have read a target tag. If all the reader devices mapped to a particular storage unit are indeed reading or have read the target tag, this represents the highest proportion or score. Conversely, if none of the reader devices that are mapped to a particular storage unit are reading the target tag, this represents the lowest proportion or score. In some embodiments, responsive to calculating the SIGNAL_PROPORTION, the storage unit with the highest SIGNAL_PROPORTION is identified and returned or determined to be the predicted storage unit that the target asset is located in.

In some embodiments, FIG. 4A also represents a prediction of the asset 470's precise location within the storage unit 404 (not just an indication that the asset 470 is within the storage unit 404, as described above). In some embodiments, predicting the precise location of the asset 470 within the storage unit 404 is based on comparing the signal strength (or indication of signal strength, such as power) between each antenna that is mapped to the storage unit 404 and the tag 472 with the signal strength or indication between each antenna mapped to the storage unit 404 and each reference tag attached to the storage device 404 (i.e., reference tags 460-1, 460-2, 460-3, 460-4, 460-6, 460-7, 460-8, 460-9, 460-10, 460-11, 460-12 and 460-13 (collectively referred to herein as the "reference tags 460"). In some embodiments, this occurs via a second pseudocode sequence. Extract all scanning data for the target asset 470 into SCANS (i.e., determine that antennas 430 and 432 have or are currently receiving data from the tag 472), which is illustrated in FIG. 4A.

Continuing with the second pseudocode sequence, responsively, certain embodiments extract all scanning data for all reference tags coupled to the storage unit 404 that the asset 470 is within (e.g., because it was already determined that the target asset 470 is within the storage unit 404), as illustrated in FIG. 4B, for example. In some embodiments, the scanning data (or any scanning data described herein) or SCANS includes signal strength readings (or indications of signal strength readings) (e.g., −75 dB, −80 dB, or any RSSI or other signal strength standard value) between a particular antenna and environment tag/target tag. FIG. 4B is a schematic diagram of the storage unit 404 of FIG. 4A, which illustrates how to predict or detect an asset's (or tag coupled to the asset's) exact location within a storage unit, according to some embodiments. Specifically, FIG. 4B illustrates that scanning data (e.g., signal strength values) is extracted between each of the reference tags 460 and the antenna 430. In various embodiments, the same process is repeated for both of the antennas 432 and 434 (i.e., scanning data is extracted between each of the reference tags 460 and each antenna 432 and 434). Continuing with description of the second pseudocode example algorithm, the unique reader device IDs present in SCANS are found and stored as ANTENNAS. Likewise, the unique reference tag IDS present in TAG_SCANS are found and stored as TAGS.

Continuing with the second pseudocode example, for each antenna in ANTENNAS: find the mean of signal strengths from the scanning data in SCANS. Subtract this average from the max possible signal strength, then divide by the max to generate a normalized distance. This is s the saved in the PACKAGE_DISTANCES. In an illustrative example of this using FIG. 4A, if a user selected a time window of 5 minutes, and the signal strength value between the antenna 430 and the asset tag 472 within the 5 minute window was −75 dB, −80 dB, and −77 dB, embodiments calculate the average ((75+80+77)/3=−77.3 dB). In various embodiments, the "max possible signal strength" is the highest scan or signal strength within the time window, which in this example is −80 dB. Accordingly, 77.3 is subtracted from 80 to arrive at 2.7. Dividing by the max may include dividing 2.7 by 80, to arrive at 0.034 to generate a normalized distance, which is saved into PACKAGE_DISTANCES. This process is repeated for each antenna mapped to the storage unit where the asset tag has been predicted to be within. For example, using the illustration above, signal strength values between antennas of the antennas 432 and 434 and the same tag 472 can also be normalized as described above. In this way, based on the signal strengths values, it is determined whether the asset tag 472 is relatively close or farther away from a particular antenna of a reader device (e.g., 430) relative to the distance between other antennas (e.g., 432 and 434). In these embodiments, signal strength or indications of signal strength is converted to distance metrics.

Continuing with the second pseudo code example, for each tag in TAGS: and for each antenna (of each reader device) in ANTENNAS: determine the mean of signal strengths from the scans in TAG_SCANS. Subtract this average from the max possible signal strength, then divide by the max to generate a normalized distance. Save this into TAG_DISTANCES. In an illustrative example of this using FIG. 4B, if a user selected a time window of 5 minutes, and the signal strength value between the antenna 430 and reference tag 460-3 within the 5 minute window was −60 dB, −65 dB, and −61 dB, embodiments calculate the average ((60+65+61)/3=−62 dB). In various embodiments, the "max possible signal strength" is the highest scan or signal strength within the time window, which in this example is −65 dB. Accordingly, 62 is subtracted from 65 to arrive at 3. Dividing by the max may include dividing 3 by 65 to arrive at 0.046 to generate a normalized distance, which is saved into TAG_DISTANCES. This process is repeated between each antenna mapped to the storage unit where the asset tag has been predicted to be within and each reference tag of the storage unit. For example, using the illustration above, signal strength values between antennas of the antennas 432 and 434 and each of the reference tags 460 can also be normalized as described above. In this way, the precise location of the asset tag 472 is predicted within the storage unit 404 based on comparing a distance between all normalized distances, which can act as data points in an embedding.

Continuing with the second pseudocode algorithm, the Euclidian distance between the asset tag 472 and all of the reference tags 460 within the storage unit 404 is calculated using PACKAGE_DISTANCES and TAG_DISTANCES as data points in space. The space for distance calculation is defined by the mean antenna signal strengths and will have a number of dimensions equivalent to the number of antennas in ANTENNAS. Store the Euclidian distances into PACKAGE_TAG_DISTANCES. In this way each PACKAGE_DISTANCES values for each antenna represents a dimension and are averaged or otherwise aggregated to form a data point or a value in PACKAGE_TAG_DISTANCES. In an illustrative example of calculating Euclidean distance using TAG_DISTANCES, referring back to FIG. 4B, the signal strength between antenna 430 and asset tag 472 may be −72 dB (a first dimension), and the signal strength between antenna 432 and asset tag 472 may be −60 dB (a second dimension), and the signal strength between antenna 434 and asset tag 472 may be −30 dB (a third dimension) each of these values can be averaged or otherwise aggregated in vector space to represent a single data point, as illustrated for example, by the data point 480 FIG. 4C.

FIG. 4C illustrates data points in dimensional or vector space that represent the signal strength indications of FIGS. 4A and 4B, according to some embodiments. In some embodiments, "data points" thus represent a finalized value that aggregates sub-values, where the sub-values represent dimensions. In an illustrative example of calculating Euclidian distance using PACKAGE_DISTANCES, referring back to FIG. 4A, the signal strength between antenna 430 and asset tag 472 may be −72 dB (a first dimension), and the signal strength between antenna 432 and asset tag 472 may be −60 dB (a second dimension), and the signal strength between antenna 434 and asset tag 472 may be −30 dB (a third dimension) each of these values can be averaged or otherwise aggregated in vector space to represent a single data point, as illustrated for example, by the data point 480 FIG. 4C. FIG. 4C represents data points in dimensional or vector space. In some embodiments, "data points" thus represent a finalized value that aggregates sub-values, where the sub-values represent dimensions.

In some embodiments, based on a user-defined K value (e.g., 3), the reference tags with the smallest K distances from PACKAGE_TAG_DISTANCES are identified. These tag identifiers and their distances to the package may be saved as "CLOSEST_TAGS". In some embodiments, a weight for each tag is generated based at least in part on normalizing the distance in CLOSEST_TAGS into the range [0,1] (0 to 1). Then CLOSEST_TAGS can be updated with this value. Some embodiments update each tag in CLOSEST_TAGS with its X and Y value from a configuration file. As described above, in some embodiments, reference tags are placed on each storage unit in regular, fixed positions. Particular embodiments treat each storage unit as a 2-dimensional X/Y grid and record the location for each tag on this grid in the configuration file (e.g., antenna 1 is in the top left, and so is at (0, 100). Then some embodiments calculate the most likely X-coordinate of the package as the weighted average of the X-coordinates from CLOSEST_TAGS. Some embodiments, repeat this step for the Y-coordinates.

FIG. 5 is a schematic diagram of an example logistics vehicle 514 illustrating a moving device 502 that is used to detect a location of an asset, according to some embodiments. Accordingly, in some embodiments, alternative or in addition using an antenna array (e.g., as illustrated in FIG. 2 or reference tags as illustrated in FIG. 3), some embodiments utilize a moving device 502 (e.g., an unmanned aerial vehicle (UAV)) that includes a reader device and antenna that receives data from one or more tags coupled to one or more of the assets within the logistics vehicle (such as the tag 506-1 of the asset), as the moving device 502 traverses through different volumes of space within logistics vehicle 514.

In operation, for example, some embodiments receive a first indication that an antenna included in the moving device 502 has received data from the tag 506-1 when the moving device 502 is in a first position (e.g., near the rear portion of the logistics vehicle 514) at a first time. For example, when the moving device 502 is within a particular distance and/or communication range threshold with the tag 506-1, the tag 506-1 transmits its ID, at a first signal strength level, to the antenna of the moving device 502. Some embodiments then receive an indication that the antenna of the moving device 502 has received another set of data from the tag 506-1 when the moving device is in a second position (e.g., near the cabin of the logistics vehicle) at a second time subsequent to the first time. For example, in response to the moving device 502 being within a particular distance and/or communication range threshold with the tag 506-1, the tag 506-1 transmits its ID again, to the antenna of the moving device 502, except at a second signal strength level. In response to receiving such second indication, particular embodiments then compare the first signal strength level with the second signal strength level. Based on which of the first signal strength level or second signal strength level is highest, particular embodiments detect the location within the logistics vehicle that the asset is located in. Such functionality can occur over multiple iterative time periods to get a general quick and dirty trilateration of the tag 506-1. For example, because the moving device 502 is closer to the asset tag 506-1 at the first position, the RSSI strength is higher and because the moving device 502 is farther away from the asset tag 506-1 at the second position, the RSSI strength is lower. Accordingly, it can be inferred that the asset tag 506-1 is near the first position because the RSSI strength is higher.

Although the moving device 502 is illustrated as a free-standing UAV that can move across any plane, angle, position, or orientation, in some embodiments, the moving device 502 traverses along a fixed path. For example, in some embodiments, the moving device 502 is a computing device coupled to a rail system 516, which is coupled to the sidewall 514-1. The rail system 516 is configured to hold the moving device 502 in place as the moving device 502 traverses from the back of the logistics vehicle 514 to the front or vice versa such that the moving device 502 is configured to only move along a fixed path along the length of the rail system 516. In some embodiments, the moving device 502 is a storage unit that moves via a carousel railing system. In these embodiments, individual storage units rotate to the location by shifting storage units (also called storage structures) within a storage space in order to facilitate efficient staging and/or retrieval of assets or parcels. Examples of this are described in U.S. application Ser. No. 16/557,573 titled "Systems, methods, and apparatuses for shifting and staging storage structures and parcels thereon," filed on Aug. 30, 2019, the contents of which are incorporated by reference in its entirety.

FIG. 6 is a diagram of a data structure 600 that maps each antenna to a particular area (e.g., a storage unit) within a logistics vehicle and whether such antenna has a high probability of a misread (e.g., a cross-read), according to some embodiments. In some embodiments, the mapping 500 represents a data structure (e.g., a lookup table, hash map, or dictionary) that is generated to indicate which area of a logistics vehicle an antenna is located in.

After the mapping 600 is generated, some embodiments use the mapping 600 to determine what area, within a logistics vehicle, a particular antenna is located in that has or is currently receiving data (e.g., a tag ID) from an asset tag, as described, for example, with respect to FIG. 1 and FIG. 2. For example, embodiments can receive information indicating that antenna ID 1 (e.g., corresponding to antenna 220-1) has or is currently receiving a tag ID from the asset tag 250-1. Responsive to receiving this information, some embodiments query or lookup the mapping 600 to map these IDs to logistics vehicle area ID 1. Accordingly, in response to receiving the antenna ID 1 based on the corresponding antenna having received or currently receiving a target tag ID, embodiments can locate the corresponding antenna ID 1 in the mapping 600 under the "antenna ID" column (which is in the first row or entry). Responsive to the value of "1" being located under the "antenna ID" column of the mapping 600, embodiments map or locate the other entry value (i.e., 1) under the "logistics vehicle area ID" columns of the same entry to determine that the antenna corresponding to antenna 1 is located in area ID 1. This same process can be repeated for each antenna that currently is reading or has read an asset tag according to this example.

As illustrated by the "high probability of misread" column, the mapping 600 illustrates whether a corresponding antenna ID of an antenna has a high likelihood of a misread, as defined by a programmer. The TRUE Boolean value indicates the probability being high. The FALSE Boolean value indicates the probability being low. Such column takes advantage of the geometries of logistics vehicles and when there is likely to be misreads, particular embodiments decrease a probability score that an asset is in a certain location (e.g., as determined by the asset location detector 106) or perform additional functionality (e.g., use the reference tags, as described in FIG. 3). In some embodiments, particular antennas are positioned in such a manner as to have a high probability, for example, of bouncing of interior housing walls. In these instances, programmers can make logistics decisions about where a package could be and when it is likely to be a misread, such as a cross-read (i.e., an antenna of a reader device that is likely to receive tag data from tags outside of its non-assigned mapped area (e.g., as indicated in the mapping 600) or otherwise far away). For example, referring to FIG. 6, a cross-read may be where the antenna 1 is capable of receiving data from logistics vehicle area ID 2, even though it is only assigned to logistics vehicle are ID 1. Such "high probability of misread" column is indicative of what different areas a particular antenna can see or receive tag data from. Some antennas can receive tag data from across the width of the logistics vehicle while others can only receive tag data from a particular end of the logistics vehicle. Accordingly, if there is a high probability that a particular antenna is picking up tag data from areas it is not assigned to, some embodiments perform additional functionality, such perform a redundancy check of using reference tags, as described with respect to FIG. 4A, FIG. 4B, and FIG. 4C, reduce the score or weight based on signal strength level, and/or otherwise decrease the score or probability that the asset is in a particular location.

IV. Apparatuses, Computer Systems, and Methods

Embodiments of the present disclosure may be implemented in various ways, including as apparatuses or a computer system that comprise articles of manufacture. An apparatus or computer system may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD- ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double information/data rate synchronous dynamic random access memory (DDR SDRAM), double information/data rate type two synchronous dynamic random access memory (DDR2 SDRAM), double information/data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices/entities, computing entities, and/or the like. As such, embodiments of the present disclosure may take the form of an apparatus, system, computing device, computing entity, and/or the like executing instructions stored on a computer-readable storage medium to perform certain steps or operations. However, embodiments of the present disclosure may also take the form of an entirely hardware embodiment performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

FIG. 7 is a flow diagram of an example process 700 for detecting the specific location of an asset within a logistics vehicle, according to some embodiments. The process 700 (and/or any of the functionality described herein) may be performed by processing logic that comprises hardware (e.g., circuitry, dedicated logic, programmable logic, microcode, etc.), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. For example, in some embodiments, the block 702 may not require a plurality of antennas, but only one antenna. The computer-implemented method, the system (that includes at least one computing device having at least one processor and at least one computer readable storage medium), and/or the computer program product/computer storage media as described herein may perform or be caused to perform the process 800, and/or any other functionality described herein. In some embodiments, the analysis computing entity 05 (described below) performs the process 700. Alternatively, some or all of the components of FIG. 1 performs the process 700.

Per block 702, particular embodiments (e.g., the analysis computing entity 05) receives an indication that a first antenna, of a plurality of antennas, has received data (e.g., a tag ID) from a first tag coupled to an asset. In some embodiments, the plurality of antennas are coupled to an interior housing within the logistics vehicle. For example, FIG. 2 and FIG. 3 illustrates a plurality of antennas within an interior housing within the logistics vehicle. In some embodiments, however, there need only be one antenna. For example, with respect to FIG. 5, there only need be one antenna within the moving device 502. In some embodiments, the logistics vehicle additionally includes a plurality of storage units a plurality of light device. Each light device, of the plurality of light devices are coupled to a respective surface of a storage unit, of the plurality of storage units. Examples of such storage units (e.g., 320) and light devices (e.g., 340) are described in FIG. 3.

In some embodiments, the antenna(s) and tag described in block 702 are RFID antenna(s) and RFID tags, which means that they incorporate a RFID communication protocol, as described herein. In some embodiments, an "indication" described herein is a message (e.g., received over the network(s) 110), a notification, a flag, signal or other indicator. In some embodiments, receiving an indication at block 702 includes receiving the data itself from the tag (e.g., by a reader device) or from an intermediate device, such as a reader device, a cloud node, or the like.

In some embodiments, block 702 is preceded by another step associated with a logistics delivery request of the asset.

For example, some embodiments receive, via a user device (e.g., a DIAD), another indication that a next asset to be delivered by a driver along the driver's route is the asset. In some embodiments, such functionality includes the functionality as described with respect to the asset location request handler 102 of FIG. 1. For example, some embodiments receive, via the user device, an indication that the delivery driver will head to a first address along the driver's route. Particular embodiments then programmatically call a function to look up a data structure to see which packages that driver will need to locate to make a delivery at the first address.

Per block 704, based at least in part on the receiving of the indication, some embodiments detect a location within the logistics vehicle that the asset is located in. For example, referring back to FIG. 2, based in receiving an indication that the antenna 220-1 has received a tag ID from the tag 250-1, receiving the corresponding antenna ID, and mapping (e.g., via the mapping 600) the antenna ID to a particular location within the logistics vehicle 214, particular embodiments detect that the asset is located with the particular location. Some embodiments receive a second indication that a second antenna, of the plurality of antennas, has also received the data from the first tag such that the detection of the location is further based on the receiving of the second indication. For example, particular embodiments receive an indication that the antenna 220-2 has also received the same tag ID of the tag 250-1. Responsively, particular embodiments determine which antenna—220-1 or 220-2—has received/transmitted data at a highest signal strength. Then, for the antenna with the highest signal strength, particular embodiments map (e.g., via the mapping 600) the selected antenna with the particular location it is located in to detect the location.

Some embodiments alternatively or additionally receive a second indication that the first antenna (or another antenna) has received data from a second tag coupled to the interior housing within the logistics vehicle (e.g., as illustrated in FIG. 3). Alternatively or additionally, the detection of the location at block 704 is based on the receiving of the second indication. For example, referring back to FIG. 3 and FIG. 4A, a server may receive an indication that the antenna 350 has received data from the tag 305-1 and the functionality as described with respect to FIG. 4A through FIG. 4C may then occur to determine the location.

In some embodiments, the detection of the location at block 704 is based at least in part on comparing indications of signal strength values between each antenna, of the plurality of antennas, and the first tag, wherein the detection of the location is based on which antenna is receiving (and/or transmitting) data at a highest signal strength value (e.g., a particular RSSI value) relative to other antennas. For example, referring back to FIG. 2, among the antenna array 220, the antenna 220-1 is receiving the tag ID of the tag 250-1 at −35 dB, which is higher than the other antennas that are receiving data at −70 dB, −80 dB, or −90 dB. Accordingly, the antenna 220-1 is mapped, via its ID (e.g., and via the mapping 600) to a particular location, which is then determined to be the detected location.

In some embodiments, block 704 includes detecting a specific location within the logistics vehicle that the asset is at based at least in part on comparing one or more indications of signal strength values between each antenna, of the plurality of antennas, and each reference tag, of a plurality of reference tags with one or more other indications of signal strength values between each antenna and the first tag, where the detecting of the location at block 704 is further based on the detecting of the specific location. Examples of this are described in FIG. 3 (and FIG. 4A and FIG. 4B) where, for example, particular embodiments detect that the asset 305 is located within the storage unit 320 (the "specific location") by comparing signal strength values between antenna 350 and reference tag 374, to signal strength values between antenna 350 and asset tag 305-1 and comparing signal strength values between the antenna 350 and reference tag 372. Particular embodiments first detect that the tag 305-1 is the tag needing to be located. Particular embodiments then detect the signal strength between such tag 305-1 and an antenna. Some embodiments then determine that the reference tag with the closest match to such signal strength is the "winner" or tag closest to the asset tag 305-1. Responsively, particular embodiments map (e.g., via the mapping 600) the reference tag ID to its storage location in order to detect the location.

In some embodiments, the detecting of the specific location using reference tags described above, such as with FIG. 3, includes representing signal strength indications between each antenna that receives data from the first tag as a first set of vector in vector space and representing signal strength indications between each tag, of the plurality of tags, each the each antenna, as a second set of vectors in vector space and determining a distance between the first set of vectors and the second set of vectors, wherein the distance corresponds to a physical proximity between the each antenna, the first tag, and each reference tag, of the plurality of tags. In some embodiments, such functionality includes the functionality as described with respect to FIG. 4C.

In some embodiments, the detecting of the location with the logistics vehicle that the asset is located in at block 704 is additionally or alternatively based on changing transmission characteristics of antennas to triangulate the position of an asset. For example, consider the following operations-causing a first signal, at a first signal strength level, to be transmitted (and/or received) from each antenna, of the plurality of antennas, the first signal strength level being identical for each RFID. For example, referring back to FIG. 2, a computing device can send a control signal to the reader device 216 to cause each antenna of the antenna array 230 to transmit a respective interrogation or propagation signal at a first RSSI value. In response to the causing transmission (or receipt) of the first signal from each antenna at the first signal strength level, particular embodiments compute, at a first time, which RFID antenna has received the data from the first tag (in response to the transmission of the first signal). For example, referring back to FIG. 2, particular embodiments determine that each antenna of the antenna array 220 has received the data. Continuing with this example, in response to the computing, particular embodiments cause a change in the signal strength level that each antenna, of the plurality of antennas, and transmit the signal to the first tag from the first level to a second level. For example, referring back to FIG. 2, the reader device 218 causes each antenna in the array 220 to transmit an interrogation signal at a second RSSI level, which is lower than the first level. And in response to the changing of the signal strength level, particular embodiments compute, at a second time subsequent to the first time, which antenna has received the data from the first tag. Based on the computing at the first time and the second time, particular embodiments then determine which antenna, of the plurality of antennas, has received a highest count of the data from the tag. For example, referring back to FIG. 2, particular embodiments determine that only the antenna 220-1 (e.g., and not the antenna 220-2) is receiving the data from the tag 250-1 at the second time. Accordingly, the antenna 220-1 has received the data from the tag twice, whereas all the other antennas have only received the data from the tag once. Accordingly, the antenna 220-1 is selected based on the count being the highest. Responsively, particular embodiments map (e.g., via the mapping 600) the antenna ID of the antenna 220-1 to its location within the vehicle and therefore detect that the asset is within such location.

This example describes the concept of facilitating low antenna signal strength outputs to detect the location of an asset. At each iterative transmission cycle, embodiments determine which asset tags respond to it (e.g., send their tag IDs). If a reader device puts out low power and then gets a response from a tag that says 2 antennas see the tag once but another third antenna sees the tag twice, particular embodiments then associate the third antenna with the location of the asset. If an antenna receives more response signals from a tag than other antennas, this means that the tag coupled to a particular asset is closer to such antenna. Some embodiments start out at a high antenna field strength such that every tag of every package is seen (i.e., each antenna is able to receive tag data from each tag). But as embodiments lower the signal strength for the antennas, only those antennas that are near the desired asset tag will be able to pick up the data from the asset tag due to communication range limitation thresholds between tag and antenna.

In some embodiments, the detecting of the location within the logistics vehicle that the asset is located in at block 704 is alternatively or additionally based on using a moving device coupled to an antenna, as described, for example, with respect to FIG. 5. In these embodiments, the receiving of the indication that the first RFID antenna has received the data from the first tag occurs when the moving device is in a first position at a first time, and the receiving of the data occurs at a first signal strength level. Particular embodiments also receive a second indication that the first RFID antenna has received another set of data from the first RFID tag when the moving device is in a second position at a second time subsequent to the first time. The receiving of the another set of data occurs at a second signal strength level. In response to the receiving of the second indication, particular embodiments compare the first signal strength level with the second signal strength level. And based on which of the first signal strength level or second signal strength level is highest, detecting the location within the logistics vehicle that the asset is located in.

In some embodiments, the detecting of the location within the logistics vehicle that the asset is located in at block 704 is additionally or alternatively based on: in response to the receiving of the indication that the first antenna, of the plurality of antennas, has received data from the first tag coupled to the asset, mapping (e.g., via the "antenna" column of the table 600 of FIG. 6) the first antenna to a first location within the logistics vehicle. And in response to the mapping, determining if the first antenna is associated with a likely misread of the data (e.g., via the "high probability misread" column of table 600 of FIG. 6). Examples of this are described with respect to FIG. 6.

Per block 706, in response to the detecting of the location, some embodiments transmit a control signal that causes a user device or apparatus to indicate that the asset is located within an area (e.g., a storage unit) associated with the location. For example, in some embodiments the logistics vehicle includes a plurality of storage units and a plurality of light devices (e.g., a series of LEDs). Each light device, of the plurality of light devices, being coupled to a respective surface of a storage unit, of the plurality of storage units. In this way, the transmitting of the control signal that causes the apparatus to indicate that the asset is located within the area associated with the location includes transmitting a control signal to a source (e.g., an antenna of an on-board computing device within a logistics vehicle) associated with first light device, of the plurality of light devices, where the first light device is coupled to a first storage unit, of the plurality of storage units. The transmitting of the control signal causes the first light device to emit light. The emission of the light indicates that the asset is located within the first storage unit. Examples of this functionality are described with respect to FIG. 3. In some embodiments the "area associated with the location" is the location itself. In other embodiments, the area and location are different. For example, a location can be trilateration coordinates and the area can be a larger predefined area, such as a storage unit that the trilateration coordinates falls in.

In some embodiments, the transmitting of the control signal that causes the user device to indicate that the asset is located within the area associated with the location includes transmitting a notification to the user device associated with a driver of the logistics vehicle, where the notification instructs the driver where, in the logistics vehicle, to pick the asset from. For example, a driver's mobile phone or DIAD may include an electronic map of the vehicle that includes user interface elements representing the different storage units within the logistics vehicle, as well as a user interface element representing a particular package, which indicates where, in the logistics vehicle, that the asset is within.

Prior to block 702, some embodiments receive, via the user device, another indication that a next asset to be delivered by a driver along the driver's route is the asset (e.g., as described with respect to the asset location request handler 102). In this way, the transmitting of the control signal at block 706 occurs as least partially responsive to the receiving of the another indication that the next asset is to be delivered by the driver along the driver's route is the asset. For example, a driver may indicate the driver's next stop on a mobile device. Responsively, some embodiments transmit a control signal to an antenna coupled to a logistics vehicle, which causes a LED to emit light at a storage unit where the asset(s) are located, which indicates that the asset(s) are to be picked from the storage unit for the driver's next stop.

V. Example Computing Environment

FIG. 8 is a schematic diagram of an example computing environment 800 in which aspects of the present disclosure are employed in, according to some embodiments. As shown in FIG. 8, this particular computing environment 800 includes one or more analysis computing entities 05 (e.g., a shipping company mainframe, cloud computing nodes, and/or logistics store desktop), one or more target tags 72 (located on one or more assets 70), one or more source computing entities 10 (e.g., a mobile device, such as a DIAD or mobile phone), and one or more logistics vehicles 11 (e.g., the logistics vehicle 200 of FIG. 2), each of which is communicatively coupled via one or more networks 110.

In some embodiments, "communicatively coupled" means that two or more components can perform data transportation between each other via a wired (e.g., Ethernet or fiber-optic medium connected in a LAN) or wireless (e.g., IEEE 802.15.4) computer protocol network. Each of these components, entities, devices, systems, and similar words used herein interchangeably may be in direct or indirect communication with one another over, for example, the same or different wired and/or wireless networks. Additionally, while FIG. 8 illustrates the various system entities as separate, standalone entities, the various embodiments are not limited to this particular architecture. In some embodiments, there are more or fewer (or combined) components than illustrated in the environment 800.

In some embodiments, one or more components of the environment 800 represent corresponding components as described herein. For example, in some embodiments, the analysis computing entity 05 represents the "server" as described herein. In some embodiments, the logistics vehicle represents the logistics vehicle illustrated in FIG. 2 or FIG. 3. In some embodiments, each of the components of the system 100 of FIG. 1 are located within the analysis computing entity 05. In some embodiments, the components of the system 100 of FIG. 1 are distributed among the components of the environment 800.

In various embodiments, the network(s) 110 represents or includes an IoT (internet of things) or IoE (internet of everything) network, which is a network of interconnected items (e.g., asset 70, and the logistics vehicle 11) that are each provided with unique identifiers (e.g., UIDs) and computing logic so as to communicate or transfer data with each other or other components. Such communication can happen without requiring human-to-human or human-to-computer interaction. For example, an IoT network may include the mobile computing entity 10 that includes an application, which sends a request, via the network(s) 110, to the analysis computing entity 05 to determine or predict where the asset 70 is located. Responsively, the reader devices 25, the antennas, and/or reference tags within the logistics vehicle 11 may help generate sensor data so that the analysis computing entity(s) 05 can analyze the data, as described above. In the context of an IoT network, a computing device can be or include one or more local processing devices (e.g., edge nodes) that are one or more computing devices configured to store and process, over the network(s) 110, either a subset or all of the received or respective sets of data to the one or more remote computing devices (e.g., the source computing entities 10 and/or the analysis computing entity 05) for analysis. An "asset" as described herein is any tangible item that is capable of being transported from one location to another. Assets may be or include the contents that enclose a product or other items people wish to ship. For example, an asset may be or include a parcel or group of parcels, a package or group of packages, a box, a crate, a drum, a container, a box strapped to a pallet, a bag of small items, and/or the like.

In some embodiments, the local processing device(s) described above is a mesh or other network of microdata centers or edge nodes that process and store local data received from the source computing entity 10 (e.g., a user device), the analysis computing entity 05, the tag 72, the tags 72, the logistics vehicle 11, and push or transmit some or all of the data to a cloud device or a corporate data center that is or is included in the one or more analysis computing entities 05. In some embodiments, the local processing device(s) store all of the data and only transmit selected (e.g., data that meets a threshold) or important data to the one or more analysis computing entities 05. Accordingly, the non-important data or the data that is in a group that does not meet a threshold is not transmitted. In various embodiments where the threshold or condition is not met, daily or other time period reports are periodically generated and transmitted from the local processing device(s) to the remote device(s) indicating all the data readings gathered and processed at the local processing device(s). In some embodiments, the one or more local processing devices act as a buffer or gateway between the network(s) and a broader network, such as the one or more networks 110. Accordingly, in these embodiments, the one or more local processing devices can be associated with one or more gateway devices that translate proprietary communication protocols into other protocols, such as internet protocols.

The tag 72 is generally responsible for indicating or emitting/transmitting data (e.g., to respective reader devices within the logistics vehicle 11), such as an identifier that identifies the respective tag, which can be used to predict the location of the target tag(s) 72 (or more generally the asset 70), as described above. For example, indications that a subset of specific reader devices (or antennas of those reader devices) are reading data from the target tag 72 can indicate that the target tag 72 is located in a particular geographical area (e.g., a particular storage unit within the logistics vehicle 11) based on a predefined mapping data structure that associates each reader with a room.

The tag(s) 72 are typically attached or otherwise coupled to target asset(s) 70, which need to be loaded in a particular logistics vehicle. Each of the target tag(s) 72 is generally responsible for indicating or emitting/transmitting data (e.g., to respective reader devices), such as an identifier that identifies the respective target tag, which can be used to predict the location of the target tag 72 (or more generally the asset 70), as describe above. Each of the tags 72 or any of the tags described herein may be or include any suitable tag, machine, manufacture, module, and/or computer-readable indicia. "Computer-readable indicia" as described herein is any tag (e.g., RFID or NFC tag) information, bar code, data matrix, numbers, lines, shapes, and/or other suitable identifier that is machine-readable (and tend not to be readable by a human) because machines can process the data. For example, the target tag(s) 72 can be Radio Frequency Identification (RFID) tags (active or passive), Near-field Communication (NFC) tags, optical computer-readable indicia, bar code computer-readable indicia, magnetic ink character recognition computer-readable indicia, and/or beacons or the like.

VI. Example Analysis Computing Entity

FIG. 9 is a block diagram of the analysis computing entity 05 of FIG. 8, according to particular embodiments of the present disclosure. In general, the terms computing entity, computer, entity, device, system, and/or similar words used herein interchangeably may refer to, for example, one or more computers, computing entities, desktops, mobile phones, tablets, phablets, notebooks, laptops, distributed systems, consoles input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In particular embodiments, these functions, operations, and/or processes can be performed on data, content, information/data, and/or similar terms used herein interchangeably.

As indicated, in particular embodiments, the analysis computing entity 05 may also include one or more communications interfaces 24 for communicating with various computing entities, such as by communicating data, content, information/data, and/or similar terms used herein interchangeably that can be transmitted, received, operated on, processed, displayed, stored, and/or the like.

As shown in FIG. 8, in particular embodiments, the analysis computing entity 05 may include or be in communication with one or more processing elements 20 (also referred to as processors, processing circuitry, and/or similar terms used herein interchangeably) that communicate with other elements within the analysis computing entity 05 via a bus, for example. As will be understood, the processing element 20 may be embodied in a number of different ways. For example, the processing element 20 may be embodied as one or more complex programmable logic devices (CPLDs), microprocessors, multi-core processors, coprocessing entities, application-specific instruction-set processors (ASIPs), microcontrollers, and/or controllers. Further, the processing element 20 may be embodied as one or more other processing devices or circuitry. The term circuitry may refer to an entirely hardware embodiment or a combination of hardware and computer program products. Thus, the processing element 20 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 20 may be configured for a particular use or configured to execute instructions stored in volatile or non-volatile media or otherwise accessible to the processing element 20. As such, whether configured by hardware or computer program products, or by a combination thereof, the processing element 20 may be capable of performing steps or operations according to embodiments of the present disclosure when configured accordingly.

In particular embodiments, the analysis computing entity 05 may further include or be in communication with non-volatile media (also referred to as non-volatile storage, memory, memory storage, memory circuitry and/or similar terms used herein interchangeably). In particular embodiments, the non-volatile storage or memory may include one or more non-volatile storage or memory media 22, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases (e.g., parcel/item/shipment database), database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or information/data that is stored in a computer-readable storage medium using one or more database models, such as a hierarchical database model, network model, relational model, entity-relationship model, object model, document model, semantic model, graph model, and/or the like.

In particular embodiments, the analysis computing entity 05 may further include or be in communication with volatile media (also referred to as volatile storage, memory, memory storage, memory circuitry and/or similar terms used herein interchangeably). In particular embodiments, the volatile storage or memory may also include one or more volatile storage or memory media 26, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 20. Thus, the databases, database instances, database management systems, data, applications, programs, program modules, scripts, source code, object code, byte code, compiled code, interpreted code, machine code, executable instructions, and/or the like may be used to control certain aspects of the operation of the analysis computing entity 05 with the assistance of the processing element 20 and operating system.

As indicated, in particular embodiments, the analysis computing entity 05 may also include one or more communications interfaces 24 for communicating with various computing entities, such as by communicating information/data, content, information/data, and/or similar terms used herein interchangeably that can be transmitted, received, operated on, processed, displayed, stored, and/or the like. Such communication may be executed using a wired information/data transmission protocol, such as fiber distributed information/data interface (FDDI), digital subscriber line (DSL), Ethernet, asynchronous transfer mode (ATM), frame relay, information/data over cable service interface specification (DOCSIS), or any other wired transmission protocol. Similarly, the analysis computing entity 05 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, long range low power (LoRa), LTE Cat M1, NarrowBand IoT (NB IoT), and/or any other wireless protocol.

Although not shown, the analysis computing entity 05 may include or be in communication with one or more input elements, such as a keyboard input, a mouse input, a touch screen/display input, motion input, movement input, audio input, pointing device input, joystick input, keypad input, and/or the like. The analysis computing entity 05 may also include or be in communication with one or more output elements (not shown), such as audio output, video output, screen/display output, motion output, movement output, and/or the like.

As will be appreciated, one or more of the analysis computing entity's 05 components may be located remotely from other analysis computing entity 05 components, such as in a distributed system. Furthermore, one or more of the components may be combined and additional components performing functions described herein may be included in the analysis computing entity 05. Thus, the analysis computing entity 05 can be adapted to accommodate a variety of needs and circumstances. As will be recognized, these architectures and descriptions are provided for exemplary purposes only and are not limiting to the various embodiments.

VII. Example Source Computing Entity

Turning now to FIG. 10, a block diagram of a source computing entity 10 of FIG. 8, according to some embodiments. In certain embodiments, source computing entity(s) 10 may be embodied as handheld computing entities, such as mobile phones, tablets, personal digital assistants, and/or the like, that may be operated at least in part based on user input received from a user via an input mechanism. Moreover, source computing entity(s)10 may be embodied as onboard vehicle computing entities, such as central vehicle electronic control units (ECUs), onboard multimedia system, and/or the like that may be operated at least in part based on user input. Such onboard vehicle computing entities may be configured for autonomous and/or nearly autonomous operation however, as they may be embodied as onboard control systems for autonomous or semi-autonomous vehicles, such as unmanned aerial vehicles (UAVs), robots, and/or the like. As a specific example, source computing entity(s) 10 may be utilized as onboard controllers for UAVs configured for picking-up and/or delivering packages to various locations, and accordingly such source computing entity(s) 10 may be configured to monitor various inputs (e.g., from various sensors) and generated various outputs. It should be understood that various embodiments of the present disclosure may comprise a plurality of source computing entities 10 embodied in one or more forms (e.g., kiosks, mobile devices, watches, laptops, carrier personnel devices (e.g., Delivery Information Acquisition Devices (DIAD)), etc.)

As will be recognized, a user may be an individual, a family, a company, an organization, an entity, a department within an organization, a representative of an organization and/or person, and/or the like-whether or not associated with a carrier. In particular embodiments, a user may operate a source computing entity 10 that may include one or more components that are functionally similar to those of the analysis computing entity 05. This figure provides an illustrative schematic representative of a source computing entity(s) 10 that can be used in conjunction with embodiments of the present disclosure. In general, the terms device, system, source computing entity, user device, entity, and/or similar words used herein interchangeably may refer to, for example, one or more computers, computing entities, desktops, mobile phones, tablets, phablets, notebooks, laptops, distributed systems, vehicle multimedia systems, autonomous vehicle onboard control systems, watches, glasses, key fobs, radio frequency identification (RFID) tags, ear pieces, scanners, imaging devices/cameras (e.g., part of a multi-view image capture system), wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Source computing entity(s) 10 can be operated by various parties, including carrier personnel (sorters, loaders, delivery drivers, network administrators, and/or the like). As shown this figure, the source computing entity(s) 10 can include an antenna 30, a transmitter 32 (e.g., radio), a receiver 44 (e.g., radio), and a processing element 36 (e.g., CPLDs, microprocessors, multi-core processors, coprocessing entities, ASIPs, microcontrollers, and/or controllers) that provides signals to and receives signals from the transmitter 32 and receiver 34, respectively. In some embodiments, the source computing entity(s) 10 additionally includes other components not shown, such as a fingerprint reader, a printer, and/or the camera.

The signals provided to and received from the transmitter 32 and the receiver 34, respectively, may include signaling information in accordance with air interface standards of applicable wireless systems. In this regard, the source computing entity(s) 10 may be capable of operating with one or more air interface standards, communication protocols, modulation types, and access types. More particularly, the source computing entity(s) 10 may operate in accordance with any of a number of wireless communication standards and protocols, such as those described above with regard to the analysis computing entity(s) 05. In a particular embodiment, the source computing entity(s) 10 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the source computing entity(s) 10 may operate in accordance with multiple wired communication standards and protocols, such as those described above with regard to the analysis computing entity(s) 05 via a network interface 44.

Via these communication standards and protocols, the source computing entity(s) 10 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The source computing entity(s) 10 can also download changes, add-ons, and updates, for instance, to its firmware, software (e.g., including executable instructions, applications, program modules), and operating system.

According to particular embodiments, the source computing entity(s) 10 may include location determining aspects, devices, modules, functionalities, and/or similar words used herein interchangeably. For example, the source computing entity(s) 10 may include outdoor positioning aspects, such as a location module adapted to acquire, for example, latitude, longitude, altitude, geocode, course, direction, heading, speed, universal time (UTC), date, and/or various other information/data. In particular embodiments, the location module can acquire information/data, sometimes known as ephemeris information/data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information can be determined by triangulating the computing entity's 10 position in connection with a variety of other systems, including cellular towers, Wi-Fi access points, and/or the like. Similarly, the source computing entity(s) 10 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices/entities (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The source computing entity(s) 10 may also comprise a user interface (that can include a display 38 coupled to a processing element 36) and/or a user input interface (coupled to a processing element 36). For example, the user interface may be a user application, browser, user interface, and/or similar words used herein interchangeably executing on and/or accessible via the source computing entity 10 to interact with and/or cause display of information from the analysis computing entity 05, as described herein. The user input interface can comprise any of a number of devices or interfaces allowing the source computing entity(s) 10 to receive information/data, such as a keypad 40 (hard or soft), a touch display, voice/speech or motion interfaces, or other input device. In embodiments including a keypad 40, the keypad 40 can include (or cause display of) the conventional numeric (0-9) and related keys (#, *), and other keys used for operating the source computing entity(s) 10 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

As shown in this figure, the source computing entity(s) 10 may also include an camera 42, imaging device, and/or similar words used herein interchangeably (e.g., still-image camera, video camera, IoT enabled camera, IoT module with a low resolution camera, a wireless enabled MCU, and/or the like) configured to capture images. The source computing entity(s) 10 may be configured to capture images via the onboard camera 42, and to store those imaging devices/cameras locally, such as in the volatile memory 46 and/or non-volatile memory 48. As discussed herein, the source computing entity(s) 10 may be further configured to match the captured image data with relevant location and/or time information captured via the location determining aspects to provide contextual information/data, such as a time-stamp, date-stamp, location-stamp, and/or the like to the image data reflective of the time, date, and/or location at which the image data was captured via the camera 42. The contextual data may be stored as a portion of the image (such that a visual representation of the image data includes the contextual data) and/or may be stored as metadata associated with the image data that may be accessible to various computing entity(s) 10.

The source computing entity(s) 10 may include other input mechanisms, such as scanners (e.g., barcode scanners), microphones, accelerometers, RFID readers, and/or the like configured to capture and store various information types for the source computing entity(s) 10. For example, a scanner may be used to capture parcel/item/shipment information/data from an item indicator disposed on a surface of a shipment or other item. In certain embodiments, the source computing entity(s) 10 may be configured to associate any captured input information/data, for example, via the onboard processing element 36. For example, scan data captured via a scanner may be associated with image data captured via the camera 42 such that the scan data is provided as contextual data associated with the image data.

The source computing entity(s) 10 can also include volatile storage or memory 46 and/or non-volatile storage or memory 48, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, information/data, applications, programs, program modules, scripts, source code, object code, byte code, compiled code, interpreted code, machine code, executable instructions, and/or the like to implement the functions of the source computing entity(s) 10. As indicated, this may include a user application that is resident on the entity or accessible through a browser or other user interface for communicating with the analysis computing entity 05 and/or various other computing entities.

In another embodiment, the source computing entity(s) 10 may include one or more components or functionality that are the same or similar to those of the analysis computing entity 05, as described in greater detail above. As will be recognized, these architectures and descriptions are provided for exemplary purposes only and are not limiting to the various embodiments.

The following embodiments represent exemplary aspects of concepts contemplated herein. Any one of the following embodiments may be combined in a multiple dependent manner to depend from one or more other clauses. Further, any combination of dependent embodiments (e.g., clauses that explicitly depend from a previous clause) may be combined while staying within the scope of aspects contemplated herein. The following clauses are exemplary in nature and are not limiting:

Some embodiments are directed to a system comprising: a logistics vehicle; a plurality of Radio Frequency Identification (RFID) antennas coupled to an interior housing within the logistics vehicle, the plurality of RFID antennas are at least partially configured to receive data from one or more RFID tags coupled to one or more assets, the plurality of RFID antennas being associated with one or more RFID reader devices; at least one computer processor; and one or more computer storage media storing computer-useable instructions that, when used by the at least one computer processor, cause the at least one computer processor to perform operations comprising: receiving an indication that a first RFID antenna, of the plurality of RFID antennas, has received data from a first RFID tag coupled to an asset, based at least in part on the receiving of the indication, detecting a location within the logistics vehicle that asset is located in, and in response to the detecting of the location, transmitting a control signal that causes a user device or apparatus to indicate that the asset is located within an area associated with the location.

In any combination of the above embodiments of the system, further comprising: a plurality of storage units within the logistics vehicle; and a plurality of light devices, each light device, of the plurality of light devices, being coupled to a respective surface of a storage unit, of the plurality of storage units, wherein the transmitting of the control signal that causes the apparatus to indicate that the asset is located within the area associated with the location includes transmitting a control signal to a source associated with first light device, of the plurality of light devices, the first light device being coupled to a first storage unit, of the plurality of storage units, the transmitting of the control signal causes the first light device to emit light, the emission of the light indicates that the asset is located within the first storage unit.

In any combination of the above embodiments of the system, the transmitting of the control signal that causes the user device to indicate that the asset is located within the area associated with the location includes transmitting a notification to the user device associated with a driver of the logistics vehicle, wherein the notification instructs the driver where, in the logistics vehicle, to pick the asset from.

In any combination of the above embodiments of the system, further comprising: a plurality of tags coupled to the interior housing of the logistics vehicle, wherein the at least one computer processor is configured to perform further operations comprising: detecting a specific location within the logistics vehicle that the asset is at based at least in part on comparing one or more indications of signal strength values between each RFID antenna, of the plurality of RFID antennas, and each tag, of the plurality of tags, with one or more other indications of signal strength values between each RFID antenna and the first RFID tag, wherein the detecting of the location within the logistics vehicle that asset is located in is further based on the detecting of the specific location.

In any combination of the above embodiments of the system, the detecting of the specific location within the logistics vehicle includes representing signal strength indications between each RFID antenna that receives data from the RFID tag as a first set of vectors in vector space and representing signal strength indications between each tag, of the plurality of tags, and the each RFID antenna, as a second set of vectors in vector space and determining a distance between the first set of vectors and the second set of vectors, wherein the distance corresponds to a physical proximity between the each RFID antenna, the RFID tag, and the each tag, of the plurality of tags.

In any combination of the above embodiments of the system, the detecting of the location within the logistics vehicle that the asset is located in is based on comparing indications of signal strength values between each RFID antenna, of the plurality of RFID antennas, and the RFID tag and detecting the location based on which RFID antenna is receiving data at a highest signal strength value relative to other RFID antennas.

In any combination of the above embodiments of the system, the detecting of the location within the logistics vehicle that the asset is located is based on: causing a first signal, at a first signal strength level, to be transmitted from each RFID antenna, of the plurality of RFID antennas, to the RFID tag, the first signal strength level being identical for each RFID antenna; and in response to the causing transmission of the first signal from each RFID antenna to the RFID tag at the first signal strength level, computing, at a first time, which RFID antenna has received the data from the RFID tag.

In any combination of the above embodiments of the system, the detecting of the location within the logistics vehicle that the asset is located is further based on: in response to the computing, causing a change in the signal strength level that each RFID antenna, of the plurality of RFID antennas, transmits the signal to the RFID tag from the first level to a second level; in response to the changing of the signal strength level, computing, at a second time subsequent to the first time, which RFID antenna has received the data from the RFID tag; and based on the computing at the first time and the second time, determining which RFID antenna, of the plurality of RFID antennas, has received a highest count of the data from the RFID tag.

In any combination of the above embodiments of the system, the detecting of the location within the logistics vehicle that the asset is located is further based on: in response to the receiving of the indication that the first RFID antenna, of the plurality of RFID antennas, has received data from the first RFID tag coupled to the asset, mapping the first RFID antenna to a first location within the logistics vehicle; and in response to the mapping, determining if the first RFID antenna is associated with a likely misread of the data.

In any combination of the above embodiments of the system, further comprising a moving device coupled to the first RFID antenna, wherein the receiving of the indication that the first RFID antenna has received the data from the first tag occurs when the moving device is in a first position at a first time, the receiving of the data occurs at a first signal strength level, the operations further comprising: receiving a second indication that the first RFID antenna has received another set of data from the first RFID tag when the moving device is in a second position at a second time subsequent to the first time, the receiving of the another set of data occurs at a second signal strength level; in response to the receiving of the second indication, comparing the first signal strength level with the second signal strength level; and based on which of the first signal strength level or second signal strength level is highest, detecting the location within the logistics vehicle that the asset is located in.

In any combination of the above embodiments of the system, the computer-useable instructions that, when used by the at least one computer processor, cause the at least one computer processor to perform further operations comprising: receiving, via the user device, another indication that a next asset to be delivered by a driver along the driver's route is the asset, wherein the transmitting of the control signal occurs as least partially responsive to the receiving of the another indication.

Some embodiments are directed to a computer-implemented method comprising: receiving a first indication that a first antenna, of a plurality of antennas, has received data from a first tag coupled to an asset, the plurality of antennas being coupled to an interior housing within a logistics vehicle; receiving a second indication that a second antenna, of the plurality of antennas, has received the data from the first tag; based at least in part on the receiving of the first indication and the receiving of the second indication, detecting a location within the logistics vehicle that asset is located in; and in response to the detecting of a location, transmitting a control signal that causes a user device or apparatus to indicate that the asset is located within an area associated with the location.

In any combination of the above embodiments of the computer-implemented method, the transmitting of the control signal that causes the apparatus to indicate that the asset is located within the area associated with the location includes transmitting a control signal to a source associated with a first light device, of a plurality of light devices, the first light device being coupled to a first storage unit, of a plurality of storage units, the transmitting of the control signal causes the first light device to emit light, the emission of the light indicates that the asset is located within the first storage unit.

In any combination of the above embodiments of the computer-implemented method, the transmitting of the control signal that causes the user device to indicate that the asset is located within the area associated with the location includes transmitting a notification to the user device associated with a driver of the logistics vehicle, wherein the notification instructs the driver where, in the logistics vehicle, to pick the asset from.

In any combination of the above embodiments of the computer-implemented method, further comprising: detecting a specific location within the logistics vehicle that the asset is at based at least in part on comparing one or more indications of signal strength values between each antenna, of the plurality of antennas, and each reference tag, of a plurality reference tags, with one or more other indications of signal strength values between each antenna and the first tag, wherein the detecting of the location within the logistics vehicle that asset is located in is further based on the detecting of the specific location, the plurality of tags coupled to the interior housing of the logistics vehicle.

In any combination of the above embodiments of the computer-implemented method, the detecting of the location within the logistics vehicle that the asset is located in is based on comparing indications of signal strength values between each antenna, of the plurality of antennas, and the first tag and detecting the location based on which antenna is receiving data at a highest signal strength value relative to other antennas.

In any combination of the above embodiments of the computer-implemented method, the detecting of the location within the logistics vehicle that the asset is located is based on: causing a first signal, at a first signal strength level, to be transmitted from each antenna, of the plurality of antennas, to the first tag, the first signal strength level being identical for each antenna; and in response to the causing transmission of the first signal from each antenna to the first tag at the first signal strength level, computing, at a first time, which antenna has received the data from the first tag.

In any combination of the above embodiments of the computer-implemented method, the detecting of the location within the logistics vehicle that the asset is located is further based on: in response to the computing, causing a change in the signal strength level that each antenna, of the plurality of antennas, transmits the signal to the first tag from the first level to a second level; in response to the changing of the signal strength level, computing, at a second time subsequent to the first time, which antenna has received the data from the first tag; and based on the computing at the first time and the second time, determining which antenna, of the plurality of antennas, has received a highest count of the data from the first tag.

Some embodiments are directed to a computer system comprising: at least one computer processor; and one or more computer storage media storing computer-useable instructions that, when used by the at least one computer processor, cause the at least one computer processor to perform operations comprising: receiving a first indication that a first antenna has received data from a first tag coupled to an asset, the first antenna being coupled to an interior housing within a logistics vehicle; receiving a second indication that the first antenna has received data from a second tag coupled to the interior housing within the logistics vehicle; based at least in part on the receiving of the first indication and the receiving of the second indication, detecting a location within the logistics vehicle that asset is located in, and in response to the detecting of a location, transmitting a control signal that causes a user device or apparatus to indicate that the asset is located within an area associated with the location.

In any embodiments of the above computer system, the detecting of the location includes detecting a specific location within the logistics vehicle that the asset is at based at least in part on comparing one or more indications of signal strength values between the first antenna and the first tag with one or more other indications of signal strength values between the first antenna and the second tag.

Definitions

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists more than one item; there must exist at least two items, but there can also be three, four, or more items.

"Includes" and any variants (e.g., including, include, etc.) means, unless explicitly noted otherwise, "includes, but is not necessarily limited to."

A "user" or a "subscriber" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

The terms first (e.g., first request), second (e.g., second request), etc. are not to be construed as denoting or implying order or time sequences unless expressly indicated otherwise. Rather, they are to be construed as distinguishing two or more elements. In some embodiments, the two or more elements, although distinguishable, have the same makeup. For example, a first memory and a second memory may indeed be two separate memories but they both may be RAM devices that have the same storage capacity (e.g., 4 GB).

The term "causing" or "cause" means that one or more systems (e.g., computing devices) and/or components (e.g., processors) may in in isolation or in combination with other systems and/or components bring about or help bring about a particular result or effect. For example, the logistics server(s) 105 may "cause" a message to be displayed to a computing entity 110 (e.g., via transmitting a message to the user device) and/or the same computing entity 110 may "cause" the same message to be displayed (e.g., via a processor that executes instructions and data in a display memory of the user device). Accordingly, one or both systems may in isolation or together "cause" the effect of displaying a message.

The term "real time" includes any time frame of sufficiently short duration as to provide reasonable response time for information processing as described. Additionally, the term "real time" includes what is commonly termed "near real time," generally any time frame of sufficiently short duration as to provide reasonable response time for on-demand information processing as described (e.g., within a portion of a second or within a few seconds). These terms, while difficult to precisely define, are well understood by those skilled in the art.

The term "coupled" to refers to two or more components being attached, fixed, or otherwise connected. Any suitable component can be used to couple components together, such as one or more: screws, bolts, nuts, hook fasteners, nails, adhesive, etc.

What is claimed is:

1. A system comprising:
    a plurality of Radio Frequency Identification (RFID) antennas coupled to an interior housing of a vehicle, the plurality of RFID antennas is at least partially configured to receive data from one or more RFID tags coupled to one or more assets, the plurality of RFID antennas being associated with one or more RFID reader devices;
    at least one computer processor; and
    one or more computer storage media storing computer-useable instructions that, when used by the at least one computer processor, cause the at least one computer processor to perform operations comprising:
        receiving a first indication that an RFID antenna of the plurality of RFID antennas has received data from an RFID tag coupled to an asset,
        based at least in part on receiving of the first indication, detecting an area within the vehicle that the asset is located,
        receiving, from a user device, a second indication that the asset is to be delivered next by a driver of the vehicle, and
        in response to detecting the area and receiving the second indication, transmitting a control signal that causes at least one of the user device or an apparatus to indicate that the asset is located within the area.

2. The system of claim 1, further comprising:
    a plurality of storage units within the vehicle; and
    a plurality of light devices, each light device of the plurality of light devices being coupled to a respective surface of a storage unit of the plurality of storage units, wherein transmitting the control signal that causes the apparatus to indicate that the asset is located within the area involves transmitting the control signal to a source associated with a first light device of the plurality of light devices, the first light device being coupled to a first storage unit of the plurality of storage units, and transmitting the control signal causes the first light device to emit light to indicate that the asset is located within the first storage unit.

3. The system of claim 1, wherein the control signal involves a notification instructing the driver where to pick the asset from in the vehicle.

4. The system of claim 1, further comprising:
    a plurality of RFID reference tags coupled to the interior housing of the vehicle, wherein the operations further comprise:
        detecting a specific location within the area that the asset is located based at least in part on comparing one or more indications of signal strength values between each RFID antenna of the plurality of RFID antennas and each RFID reference tag of the plurality of RFID reference tags with one or more other indications of signal strength values between each RFID antenna of the plurality of RFID antennas and the RFID tag.

5. The system of claim 4, wherein detecting the specific location comprises representing the one or more others indications of signal strength values between each RFID antenna of the plurality of RFID antennas that receives the data from the RFID tag as a first set of vectors in vector space and representing the one or more indications of signal strength values between each RFID reference tag of the plurality of RFID reference tags and the each RFID antenna of the plurality of RFID antennas as a second set of vectors in vector space and determining a distance between the first set of vectors and the second set of vectors that corresponds to a physical proximity between each RFID antenna of the plurality of RFID antennas, the RFID tag, and each RFID reference tag of the plurality of RFID reference tags.

6. The system of claim 1, wherein detecting the area within the vehicle that the asset is located is based at least in part on comparing indications of signal strength values between each RFID antenna of the plurality of RFID antennas and the RFID tag and identifying which RFID antenna of the plurality of RFID antennas is receiving the data at a highest signal strength value relative to other RFID antennas of the plurality of RFID antennas.

7. The system of claim 1, wherein detecting the area within the vehicle that the asset is located is based at least in part on:
    causing a first signal, at a first signal strength level, to be transmitted from each RFID antenna of the plurality of RFID antennas to the RFID tag, the first signal strength level being identical for each RFID antenna; and
    in response to causing transmission of the first signal from each RFID antenna of the plurality of RFID antennas to the RFID tag at the first signal strength level, computing, at a first time, which RFID antennas from the plurality of RFID antennas have received the data from the RFID tag.

8. The system of claim 7, wherein detecting the area within the vehicle that the asset is located is further based at least in part on:
    in response to computing which RFID antennas from the plurality of RFID antennas has received the data from the RFID tag, causing a change in signal strength that each RFID antenna of the plurality of RFID antennas transmits a signal to the RFID tag from the first signal strength level to a second signal strength level;
    in response to changing the signal strength, computing, at a second time subsequent to the first time, which RFID antennas from the plurality of RFID antennas have received the data from the RFID tag; and
    based at least in part on computing which RFID antennas from the plurality of RFID antennas have received the data from the RFID tag at the first time and the second time, determining which RFID antenna of the plurality of RFID antennas has received a highest count of the data from the RFID tag.

9. The system of claim 1, wherein detecting the area within the vehicle that the asset is located is further based at least on part on:
    in response to receiving the first indication that the RFID antenna of the plurality of RFID antennas has received the data from the RFID tag coupled to the asset, mapping the RFID antenna to a first location within the vehicle; and in response to mapping the RFID antenna to the first location, determining if the RFID antenna is associated with a likely misread of the data.

10. The system of claim 1, further comprising a moving device coupled to the RFID antenna, wherein receiving the first indication that the RFID antenna has received the data from the RFID tag occurs when the moving device is in a first position at a first time and at a first signal strength level, and the operations further comprise:

receiving a third indication that the RFID antenna has received another instance of the data from the RFID tag that occurs when the moving device is in a second position at a second time subsequent to the first time and at a second signal strength level;

in response to receiving the third indication, comparing the first signal strength level with the second signal strength level; and based at least in part on which of the first signal strength level or the second signal strength level is highest, detecting the area within the vehicle that the asset is located.

11. A method comprising:

receiving, by a computing entity, a first indication that a first antenna of a plurality of antennas has received data from a tag coupled to an asset, the plurality of antennas being coupled to an interior housing of a vehicle;

receiving, by the computing entity, a second indication that a second antenna of the plurality of antennas has received the data from the tag;

based at least in part on the receiving of the first indication and the second indication, detecting, by the computing entity, an area within the vehicle that the asset is located;

receiving, by the computing entity and from a user device, a third indication that the asset is to be delivered next by a driver of the vehicle;

in response to detecting the area and receiving the third indication, transmitting, by the computing entity, a control signal that causes at least one of the user device or an apparatus to indicate that the asset is located within the area.

12. The method of claim 11, wherein transmitting the control signal that causes the apparatus to indicate that the asset is located within the area involves transmitting the control signal to a source associated with a first light device of a plurality of light devices, the first light device being coupled to a first storage unit of a plurality of storage units, and transmitting the control signal causes the first light device to emit light indicating that the asset is located within the first storage unit.

13. The method of claim 11, wherein transmitting the control signal that causes the user device to indicate that the asset is located within the area involves transmitting a notification to the user device that instructs the driver where to pick the asset from in the vehicle.

14. The method of claim 11, further comprising:

detecting, by the computing entity, a specific location within the area that the asset is located based at least in part on comparing one or more indications of signal strength values between each antenna of the plurality of antennas and each reference tag of a plurality reference tags with one or more other indications of signal strength values between each antenna of the plurality of antennas and the tag.

15. The method of claim 11, wherein detecting the area within the vehicle that the asset is located is based at least in part on comparing indications of signal strength values between each antenna of the plurality of antennas and the tag and identifying which antenna of the plurality of antennas is receiving the data at a highest signal strength value relative to other antennas of the plurality of antennas.

16. The method of claim 11, wherein detecting the area within the vehicle that the asset is located is based at least in part on:

causing a first signal, at a first signal strength level, to be transmitted from each antenna of the plurality of antennas to the tag, the first signal strength level being identical for each antenna; and in response to causing transmission of the first signal from each antenna of the plurality of antennas to the tag at the first signal strength level, computing, at a first time, which antennas of the plurality of antennas have received the data from the tag.

17. The method of claim 16, wherein detecting the area within the vehicle that the asset is located is further based at least in part on:

in response to computing which antennas of the plurality of antennas have received the data from the tag, causing a change in a signal strength that each antenna of the plurality of antennas transmits the first signal to the tag from the first signal strength level to a second signal strength level;

in response to changing the signal strength, computing, at a second time subsequent to the first time, which antennas of the plurality of antennas have received the data from the tag; and based at least in part on computing which antennas of the plurality of antennas have received the data from the tag at the first time and the second time, determining which antenna of the plurality of antennas has received a highest count of the data from the tag.

18. A computer system comprising:

at least one computer processor; and one or more computer storage media storing computer-useable instructions that, when used by the at least one computer processor, cause the at least one computer processor to perform operations comprising:

receiving a first indication that an antenna has received first data from a tag coupled to an asset, the antenna being coupled to an interior housing of a vehicle;

receiving a second indication that the first antenna has received second data from a reference tag coupled to the interior housing of the vehicle;

based at least in part on receiving the first indication and the second indication, detecting an area within the vehicle that the asset is located; and receiving, from a user device, a third indication that the asset is to be delivered next by a driver of the vehicle;

in response to detecting the area and receiving the third indication, transmitting a control signal that causes at least one of the user device or an apparatus to indicate that the asset is located within the area.

19. The computer system of claim 18, wherein detecting the area includes detecting a specific location within the area that the asset is located based at least in part on comparing one or more indications of signal strength values between the antenna and the tag with one or more other indications of signal strength values between the antenna and the reference tag.

* * * * *